US012029704B2

(12) United States Patent
Bianco et al.

(10) Patent No.: US 12,029,704 B2
(45) Date of Patent: Jul. 9, 2024

(54) MEDICATION DOSING SYSTEMS AND METHODS

(71) Applicant: Omnicell, Inc., Mountain View, CA (US)

(72) Inventors: Walter Bianco, Trieste (IT); Charles Marsh, Cranberry Township, PA (US); Ryan Kaintz, Allison Park, PA (US); Alessandro Jurman, Muggia (IT); Stefano Del Sal, Trieste (IT); Sameer Udeshi, Sewickley, PA (US)

(73) Assignee: Omnicell, Inc., Mountain View, CA (US)

( * ) Notice: Subject to any disclaimer, the term of this patent is extended or adjusted under 35 U.S.C. 154(b) by 788 days.

(21) Appl. No.: 17/005,786

(22) Filed: Aug. 28, 2020

(65) Prior Publication Data

US 2022/0062107 A1    Mar. 3, 2022

(51) Int. Cl.
*A61J 1/20* (2006.01)
*A61J 1/22* (2006.01)
*B25J 9/02* (2006.01)
*B25J 9/06* (2006.01)

(52) U.S. Cl.
CPC .............. *A61J 1/2096* (2013.01); *A61J 1/201* (2015.05); *A61J 1/2055* (2015.05); *A61J 1/2065* (2015.05); *A61J 1/22* (2013.01); *B25J 9/02* (2013.01); *B25J 9/06* (2013.01)

(58) Field of Classification Search
CPC ............ B65B 3/003; A61J 1/2096; A61J 1/22
See application file for complete search history.

(56) References Cited

U.S. PATENT DOCUMENTS

| 5,479,969 | A | * | 1/1996 | Hardie | ................... B65B 3/003 |
| | | | | | 422/549 |
| 6,991,002 | B2 | | 1/2006 | Osborne et al. | |
| 8,191,339 | B2 | | 6/2012 | Tribble et al. | |
| 8,386,070 | B2 | | 2/2013 | Eliuk et al. | |
| 9,840,343 | B2 | | 12/2017 | Tachibana et al. | |

(Continued)

OTHER PUBLICATIONS

ASHP, "ASHP Crosswalk of Guidances and Standards for Managing Single (SDV) and Multi-Dose Vials (MDV)", Jul. 2013 (Year: 2013).*

(Continued)

*Primary Examiner* — Timothy P. Kelly
(74) *Attorney, Agent, or Firm* — Kilpatrick Townsend & Stockton LLP

(57) ABSTRACT

A method of preparing liquid medication doses using an automated dosing device may include securing a vial within a vial holder. The vial includes a liquid medicament. An empty syringe is secured within a syringe holder with a plunger of the syringe being secured by a plunger gripper and a luer lock of the syringe within a luer lock gripper. The syringe holder and the vial holder are moved closer together to insert a needle of the syringe through a septum of the vial while longitudinal axes of the syringe and the vial are at a downward angle and while the vial holder is lower than the syringe holder. The syringe holder and the vial holder are rotated to vertically align the longitudinal axes with the vial holder above the syringe holder. The plunger gripper is pulled away from the luer lock gripper to transfer liquid medicament into the syringe.

11 Claims, 19 Drawing Sheets

(56) References Cited

U.S. PATENT DOCUMENTS

2012/0241043 A1* 9/2012 Perazzo ............... A61J 7/0053
141/2
2018/0297193 A1 10/2018 Garfield et al.

OTHER PUBLICATIONS

International Application No. PCT/US2021/046200 received an International Search Report and Written Opinion, mailed on Dec. 9, 2021, 10 pages.

* cited by examiner

MEDICATION DOSING SYSTEMS AND METHODS

CROSS-REFERENCES TO RELATED APPLICATIONS

This application is related to U.S. patent application Ser. No. 17/005,637, filed concurrently herewith and titled "Bag Transfer Mechanism for IV Compounding"; U.S. patent application Ser. No. 17/005,650, filed concurrently herewith and titled "Cartridge Loading System for Syringe Caps"; U.S. patent application Ser. No. 17/006,027, filed concurrently herewith and titled "Systems and Methods for Parallel Preparation Processing"; and U.S. patent application Ser. No. 17/005,803, filed concurrently herewith and titled "Cabinet with Integrated Pick-and-Place Mechanism"; the disclosures of which are hereby incorporated by reference herein in their entireties for all purposes.

BACKGROUND OF THE INVENTION

Conventional pharmacy compounding robots utilize a robot arm as an extensive part of a process for transferring fluids from one container to another (such as from a vial to a syringe and/or bag). Oftentimes, these robot arms are general purpose robot arms that are adapted for a specific purpose using custom application software. This heavy reliance on the robot arm, in particular general purpose robot arms, often leads to spills and leaks, as well as relatively slow performance. Additionally, conventional compounding robots fail to implement milking procedures that are tailored to the physical parameters of the process. This leads to increased setup times to empirically initialize the milking process to operate with a desired accuracy, leading to reduced throughput. Improvements to address these and other problems are desired.

BRIEF SUMMARY OF THE INVENTION

Embodiments of the present invention are directed to systems and methods for automatically transferring doses of liquid medicaments from multi-dose containers to end-use single dose containers. Embodiments provide an automated dosing device that may securely hold vials, syringes, medication bags, and the like, while keeping fluid transfer sites exposed to first air from a clean air source. Embodiments further provide efficient milking processes to more effectively facilitate fluid transfer from new vials while reducing the occurrence of spills and leaks.

In one embodiment, a method of preparing liquid medication doses using an automated dosing device is provided. The method may include securing a vial within a vial holder of the automated dosing device. The vial may include a liquid medicament. The method may also include securing an empty syringe within a syringe holder of the automated dosing device with a plunger of the syringe being secured by a plunger gripper of the automated dosing device and a luer lock of the syringe being secured within a luer lock gripper and aligning and moving the syringe holder and the vial holder closer together to insert a needle of the syringe through a septum of the vial while longitudinal axes of the syringe, a needle of the syringe, and the vial are at a downward angle relative to horizontal and while the vial holder is at a lower position than the syringe holder. The method may further include rotating the syringe holder and the vial holder to align the longitudinal axes with a vertical axis with the vial holder positioned above the syringe holder and pulling the plunger gripper away from the luer lock gripper to transfer a volume of the liquid medicament into the syringe.

In some embodiments, the method may include loading the syringe in the syringe holder using a robot arm. The method may include releasing the syringe from the syringe holder. The method may further include aligning the syringe holder with a medication bag along the vertical axis, moving the syringe holder closer to the medication bag to insert the needle of the syringe into a port of the medication bag, and pushing the plunger gripper toward the luer lock gripper to transfer the volume of the liquid medicament into the medication bag. The method may also include rotating the syringe holder and the vial holder such that the longitudinal axes are at the downward angle and moving the syringe holder and the vial holder apart from one another to withdraw the needle from the septum. The method may include blowing first air from a clean air source directly onto fluid transfer locations of the automated dosing device. In some embodiments, pulling the plunger gripper away from the luer lock gripper to transfer a volume of the liquid medicament into the syringe may be performed as part of a milking procedure to remove a first number of doses of the liquid medicament from the vial. The milking procedure may include pulling the plunger gripper away from the luer lock gripper to introduce air into the syringe prior to inserting the needle of the syringe through the septum of the vial, pushing the plunger gripper toward the luer lock gripper to introduce air into the vial after inserting the needle of the syringe through the septum of the vial, pulling the plunger gripper away from the luer lock gripper to introduce liquid into the syringe, and determining whether a volume of the liquid in the syringe matches a desired dose. The milking procedure may further include pushing the plunger gripper toward the luer lock gripper to introduce a portion of the liquid from the syringe back into the vial if the volume of the liquid exceeds the desired dose. In some embodiments, pushing the plunger gripper toward the luer lock gripper to introduce a portion of the liquid from the syringe back into the vial may be performed after waiting a predefined dwell time. The method may include transferring an additional volume of the liquid medicament from the vial into an additional syringe.

In another embodiment, an automated dosing device is provided. The device may include a rotating support, with the rotating support being rotatable along a vertical plane. The device may also include a syringe holder coupled with the rotating support, with the syringe holder including a plunger gripper and a luer lock gripper. The device may further include a vial holder that is detachably coupled with the rotating support, a processor, and a memory. The memory may have instructions stored thereon that, when executed by the processor, cause the automated dosing device to secure a vial of liquid medicament within the vial holder and secure an empty syringe within the syringe holder by grasping a plunger of the syringe with the plunger gripper and grasping a luer lock of the syringe within the luer lock gripper. The instructions may also cause the device to move the syringe holder and the vial holder closer together to insert a needle of the syringe through a septum of the vial while longitudinal axes of the syringe and the vial are at a downward angle relative to horizontal and while the vial holder is at a lower position than the syringe holder. The instructions may further cause the device to rotate the rotating support, the syringe holder, and the vial holder to align the longitudinal axes with a vertical axis with the vial holder positioned above the syringe holder and pull the plunger gripper away from the luer lock gripper to transfer a volume of the liquid medicament into the syringe.

In some embodiments, the device may also include a medication bag holder. The instructions may further cause the automated dosing device to align the syringe holder with a medication bag along the vertical axis, move the syringe holder closer to the medication bag to insert the needle of the syringe into a port of the medication bag, and push the plunger gripper toward the luer lock gripper to transfer the volume of the liquid medicament into the medication bag. Each fluid transfer location of the automated dosing device may be disposed within a direct flow of first air from a clean air source. The syringe holder may further include a body holder that includes arms. The instructions may further cause the automated dosing device to move the arms toward one another to tighten the body holder against an end of a body of the syringe proximate the plunger. The instructions may further cause the automated dosing device to release the syringe from the syringe holder. In some embodiments, releasing the syringe may include rotating the syringe holder and the vial holder such that the longitudinal axes are at the downward angle, moving the syringe holder and the vial holder apart from one another to withdraw the needle from the septum, and loosening the plunger gripper and the luer lock gripper. The instructions may further cause the device to load a subsequent syringe into the syringe holder and transfer an additional volume of the liquid medicament from the vial into the subsequent syringe.

In another embodiment, an automated dosing device includes a rotating support, the rotating support and a syringe holder coupled with the rotating support. The syringe holder may include a plunger gripper and a luer lock gripper. The plunger gripper may be translatable relative to the luer lock gripper along a longitudinal axis of the syringe holder. The device may also include a vial holder that is detachably coupled with the rotating support. The rotating support may be rotatable along a vertical plane to move the vial holder and the syringe holder from a loading position in which longitudinal axes of the syringe and the vial are at a downward angle relative to horizontal and with the vial holder being at a lower position than the syringe holder to a syringe filling position in which the longitudinal axes are aligned with a vertical axis and with the vial holder being positioned above the syringe holder.

In some embodiments, the plunger gripper may include three arms. Each of the three arms may include a gripping element. Each of the three arms may be rotatable to loosen and tighten the plunger gripper. The vial holder may include a base plate and a cap gripper comprising two arms that are spaced apart from the base plate. The two arms may be movable relative to one another to adjust a distance between the two arms. The two arms may be translatable to adjust a distance between the cap gripper and the base plate. The device may also include a medication bag holder disposed at a height below the syringe holder. The rotating support may be rotatable to align the syringe holder with the medication bag holder along the vertical axis.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label. Additionally, where similar components include the same first reference label, the similar components may have similar structure and operation except where explicitly stated otherwise.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It will be understood that various changes may be made in the function and arrangement of elements without departing from the spirit and scope of the invention as set forth in the appended claims. Merely by way of example, any embodiment described herein may or may not have any of the features discussed therewith, and may or may not have any feature discussed with respect to other embodiments.

Embodiments of the present invention are directed to automated dosing mechanisms that facilitate high speed, accurate fluid transfer processes. Additionally, embodiments are designed to prevent biological contamination and cross-contamination of the final dose. Embodiments achieve these goals by improving syringe and vial handling and preventing contact with certain critical components, such as the needle of the syringe, while maintaining critical fluid transfer surfaces (such as the needle tip and vial septum) exposed to ISO5 air from a HEPA filter to ensure the surfaces remain sterile. Embodiments further provide reliable securement devices for various containers, allowing a robotic arm to consistently execute a fluid transfer between a vial and syringe/bag. Embodiments further achieve these goals by improving the fluid transfer process between a vial and syringe by utilizing an efficient milking process.

The milking processes described herein provide numerous benefits over conventional milking processes, including a simpler and quicker initialization process and more accurate liquid dosing. In particular, the milking procedures of the present invention eliminate the need to set parameters of a syringe with respect to the specific drug in order to have an accurate dose. Additionally, embodiments of the milking process calculate a dwell time for each stroke (instead of having a constant value), which enhances the effectiveness of the process and increases throughput. Embodiments further calculate losses (such as those caused by the friction of liquid inside the needle) and the plunger seal deformation (caused by air pressure within the syringe), which enables the automated dosing device to stop the milking process as soon as the air is eliminated from the syringe and the plunger is filled with a desired volume of liquid medicament.

Figure 1:
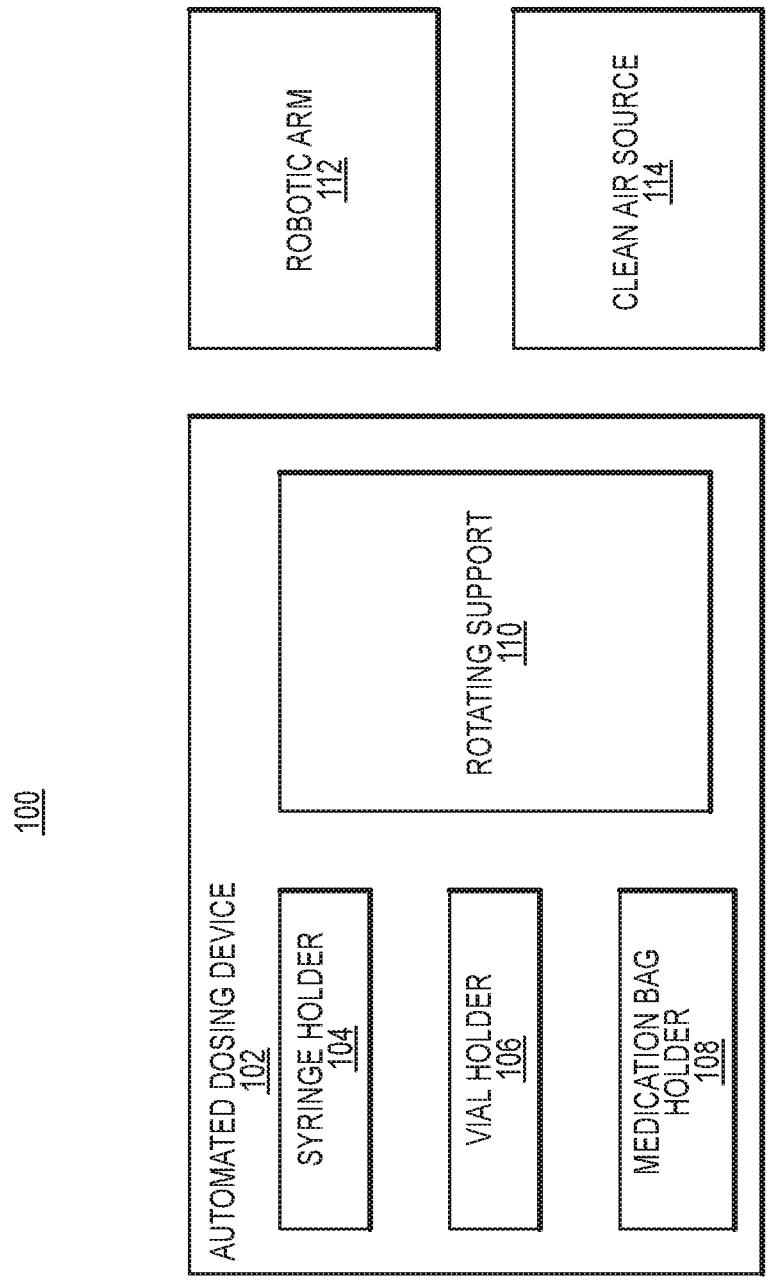
FIG. 1 is a system diagram of a system for automated dosing of liquid medicaments according to embodiments of the present invention.

Turning now to FIG. 1, a diagram of a system 100 that provides automated dosing of liquid medicaments is illustrated. The system 100 may include an automated dosing device 102. Automated dosing device 102 may be configured to automatically transfer accurately metered doses of liquid medicaments from multi-dose containers (such as vials) to single dose containers, such as syringes and medication bags (such as IV bags). The automated dosing device 102 may include a syringe holder 104 that is designed to grasp and secure a syringe, as well as provide a pushing and pulling force on a plunger of the syringe to transfer liquid medicament to and from the syringe. The syringe holder 104 may be adjustable to accommodate syringes of any length and/or diameter (oftentimes 3-60 ml syringes), and may be designed to hold the syringe in a manner that corrects any misalignment that may be caused by syringe/needle manufacture tolerance variability. The automated dosing device 102 may also include a vial holder 106 that is designed to grasp and secure a vial or other multi-dose container of liquid medicament. Vial holder 104 may be adjustable to accommodate vials of any length and/or diameter (oftentimes 2-100 ml vials). The automated dosing device 102 may also include a medication bag holder 108 that may be designed to grasp and secure a mediation bag for transfer of liquid medicament into the medication bag. The medication bag holder 108 may be designed to accommodate medication bags of any size.

The syringe holder 104, vial holder 106, and the medication bag holder 108 may be coupled with and/or arranged at specific locations relative to a rotating support 110. Rotating support 110 may be rotatable within a generally vertical plane to rotate and/or align the syringe holder 104, vial holder 106, and/or the medication bag holder 108 for various fluid transfer processes. For example, rotation of the rotating support 110 may 1) move the syringe holder 104 into a downward angled position (in alignment with the syringe holder 106) to insert a needle of the syringe into a vial held by the vial holder 106, 2) move the syringe holder 104 and the vial holder into alignment with a vertical axis, with the vial holder 106 positioned above the syringe holder 104 to facilitate a transfer of liquid medicament from the vial to the syringe, and/or 3) move the syringe holder 104 into vertical alignment with the medication bag holder 108 to facilitate transfer of liquid medicament from the syringe to a medication bag. It will be appreciated that the rotating support 110 may be rotated to one or more other positions to facilitate loading and/or unloading of syringes and/or vials, to facilitate withdrawal of the needle of the syringe from the vial, and/or perform other various functions.

The system 100 may also include one or more robotic arms 112. The robotic arm 112 may be used to transfer medication containers from storage areas to the automated dosing device 102 and vice versa. For example, at the beginning of, or prior to, a fluid transfer process, the robotic arm 112 may grasp a vial of liquid medicament from a storage or staging area and position the vial within the vial holder 106 of the automated dosing device 102. Similarly, the robotic arm 112 may grasp an empty syringe and position the syringe within the syringe holder 104. In embodiments where the final fluid transfer location is the syringe, the robotic arm 112 may grasp a filled syringe and remove the syringe from the syringe holder 106 and replace the filled syringe with a new empty syringe for filling. In embodiments where the final fluid transfer is to a medication bag, the robotic arm 112 may be used to grasp and remove the empty syringe (after transfer of fluid to the medication bag) and/or grasp and remove the filled medication bag. The robotic arm 112 may then replace the removed syringe and/or medication bag on the automated dosing device 102. The robotic arm 112 may also be used to switch out vials when the vial is empty and/or when a new medicament is to be transferred. It will be appreciated that the robotic arm 112 may be programmed to perform various other functions to meet the needs of a particular application.

System 100 may also include a clean air source 114. For example, clean air source 114 may include one or more air vents that deliver clean air in the proximity of the automated dosing device 102. To deliver clean air, the clean air source 114 may include one or more filters, such as a high efficiency filter, for example a High Efficiency Particulate Air (HEPA) and/or an ultra-low particulate air (ULPA) filter that filters out particulate within the air to clean room standards. For example, the filters may be designed to provide a minimum of ISO Class 5 clean air (which contains a maximum concentration of particulate ≥0.1 μm of 100,000 particles/m$^3$) (as defined in ISO 14644-1:2015) to the automated dosing device 102. The various vents may be positioned to provide first air flow of the clean air to critical areas of the automated dosing device 102, such as where fluid transfers are conducted. For example, first air from the clean air source 112 may be directed to positions where the needle of a syringe is interfaced with the vial and/or medication bag. As indicated above, each fluid transfer location of the system 100 is considered to be a "critical site" for which cleanliness is especially important. For this reason, it is highly desirable that the critical sites be subjected to "first air" as much of the time as possible. The term "first air" refers to air that flows unidirectionally from the filters and does not encounter any other item before washing over the critical sites. As such, first air has not had any chance to take up particles or other contaminants from other items inside before washing over the critical sites.

Figure 2A:
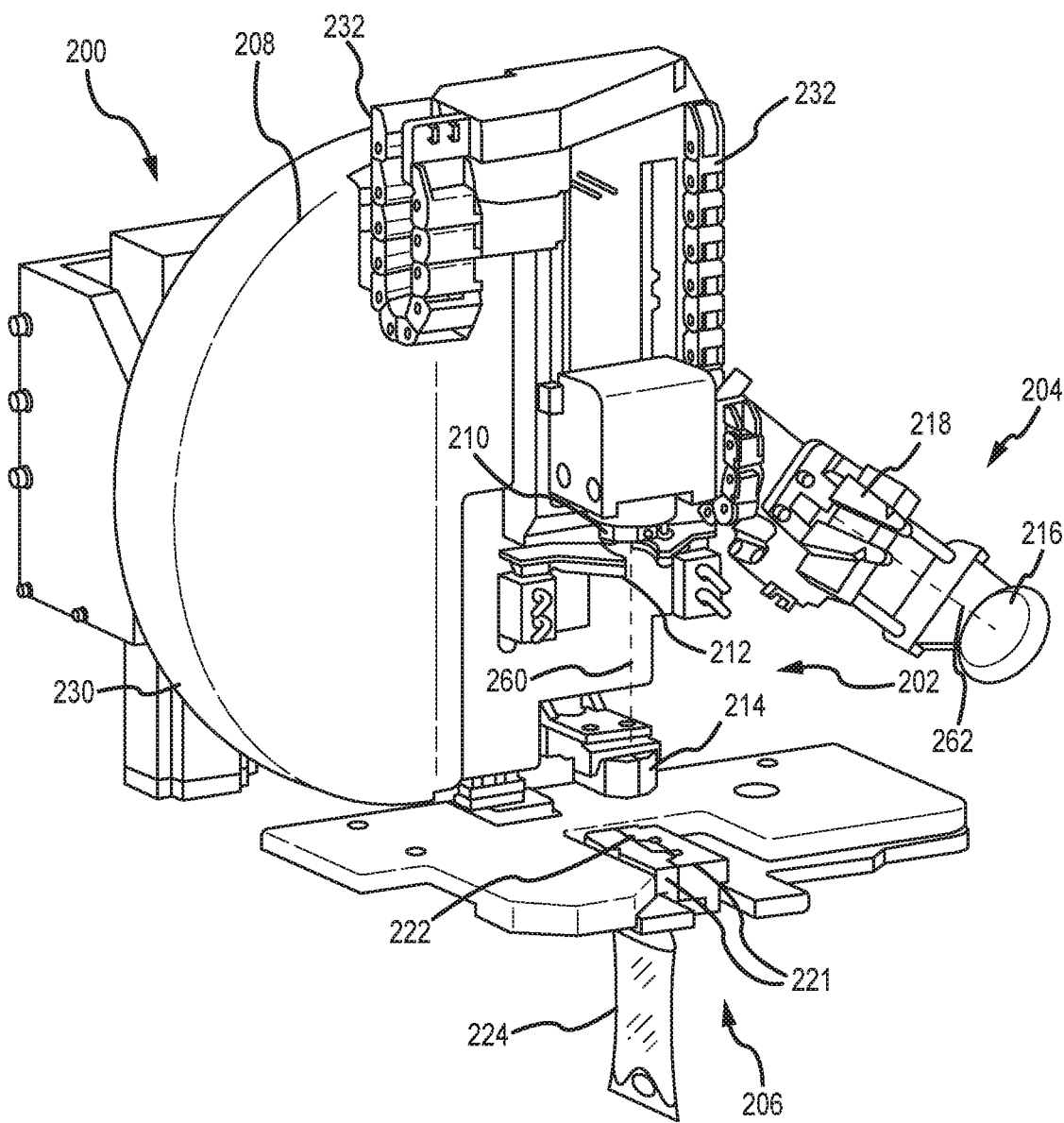
FIG. 2A illustrates an automated dosing device according to embodiments of the present invention.
Figure 2B:
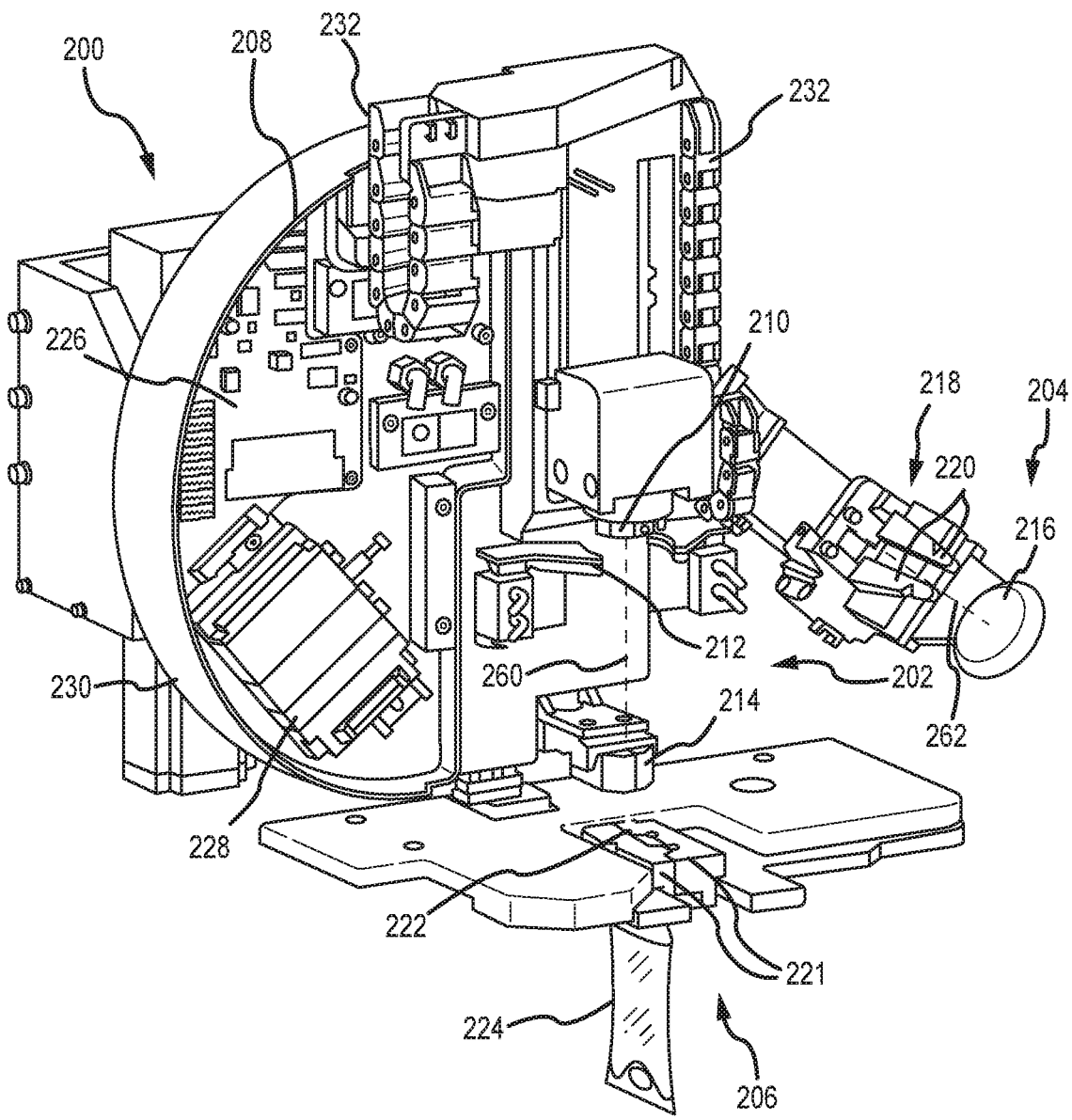
FIG. 2B illustrates the automated dosing device of FIG. 2A with a cover removed.

FIGS. 2A and 2B illustrate an embodiment of an automated dosing device 200. Automated dosing device 200 may include similar features and perform similar functions as automated dosing device 102 described above. For example, the automated dosing device 200 may include a syringe holder 202 (which may include similar features and perform similar functions as syringe holder 104), a vial holder 204 (which may include similar features and perform similar functions as vial holder 106), a medication bag holder 206 (which may include similar features and perform similar functions as medication bag holder 108), and a rotating support 208 (which may include similar features and perform similar functions as rotating support 110). As indicated above, the rotating support 208 may be configured to rotate within a generally vertically-oriented plane to move various components of the automated dosing device 200. For example, the syringe holder 202 may be mounted on the rotating support 208 such that rotation of the rotating support 208 causes a corresponding rotation of the syringe holder 202. As will be discussed in greater detail in conjunction with FIGS. 4A and 4B, the vial holder 204 may be coupled with the rotating support 208 so as to be selectively rotatable with the rotating support 208. For example, the rotating support 208 may rotate to move the syringe holder 202 into alignment with the vial holder 204 such that longitudinal axes of both the syringe holder 202 and the vial holder 204 are aligned along an angle that is downward relative to a horizontal plane. The generally downward angle may be between about 30 and 60 degrees from horizontal, commonly between about 40 and 50 degrees, and often about 45 degrees. In some embodiments, a downward degree of the angle may be driven by a fill level of the vial, as the downward orientation may ensure that no liquid medicament is touching a portion of a septum of a vial through which a needle of a syringe is inserted in order to reduce the occurrence of leaks or spills. In this position, the syringe holder 202 and/or vial holder 204 may be moved to bring the syringe holder 202 and vial holder 204 closer together to insert the needle of the syringe through the septum of the vial. Once the syringe has been interfaced with the vial, the vial holder 204 may be engaged with the rotating support 208. The rotating support 208 may then rotate to move both the syringe holder 202 and the vial holder 204 into alignment with a vertical axis, with the vial holder 204 being positioned above the syringe holder 202 to facilitate a transfer of liquid medicament from the vial to the syringe. The vial holder 204 may be disengaged from the rotating support 208 and the rotating support 208 may rotate the syringe holder 202 into vertical alignment with the medication bag holder 206 to facilitate transfer of liquid medicament from the syringe to a medication bag 224.

The syringe holder 202 may include a plunger gripper 210, a body gripper 212, and/or a luer lock gripper 214. An opening size of each gripper of the syringe holder 202, as well as a distance between each component may be adjustable, allowing the syringe holder 202 to be able to accommodate syringes of all different sizes. The plunger gripper 210 is configured to grasp a plunger of the syringe and may be translatable along a longitudinal axis 260 of the syringe holder 202 to push and pull the plunger of the syringe to transfer fluid in and out of the syringe. The body gripper 212 may be configured to grasp near an end of a body of the syringe that is closest to the plunger. This area of the syringe is radially supported by the material forming the end of the body. This ensures that the syringe may be secured by the syringe holder 202 without any radial force being applied to the syringe body, which eliminates the possibility of syringe deformation that may lead to dosing measurement errors. The luer lock gripper 214 may be designed to grasp the luer lock and/or needle hub of the syringe. This ensures that the automated dosing device 200 does not contact the needle of the syringe, which helps prevent bacterial and/or cross contamination of the syringe. In some embodiments, the luer lock gripper 214 may be configured to grip the needle of the syringe at a base of a shaft of the needle, allowing the luer lock gripper 214 to correct for possible deviation of the needle tip from the central axis defined by the body of the syringe.

The vial holder 204 may include a base plate 216 and a cap gripper 218. The base plate 216 may include a generally flat surface that is configured to interface with a bottom of a vial, such as a serum vial that includes a septum. In some embodiments, the flat surface may be formed of a material, such as rubber, that is deformable and/or has a high coefficient of friction and/or anti-slip coating that helps maintain the vial in a desired position. The cap gripper 218 may include at least two arms 220 that are spaced apart from the base plate 216 along a longitudinal axis of the vial holder 204. The arms 220 may be movable relative to one another to adjust a distance between the arms 220 such that the vial holder 204 may loosen and tighten a grip of the cap gripper 218 applied to the cap of a vial, as well as enables the cap gripper 218 to accommodate vials with various sizes of caps. The cap gripper 218 may be translatable relative to the base plate 216 along a longitudinal axis of the vial holder 204, enabling the vial holder 204 to accommodate vials of different lengths.

The medication bag holder 206 may be disposed beneath the rotating support 208, vial holder 204, and syringe holder 202. The medication bag holder 206 include two or more plates 221. Each of the plates 221 may define a portion of at least one luer lock opening 222. For example, the illustrated embodiment includes two plates 221 that have inner edges that each define a portion of a luer lock opening 222. The plates 221 may be movable relative to one another along a horizontal axis to move the plates 221 together and apart, which may adjust a size of the luer lock opening 222. Plates 221 may be moved apart to enlarge the luer lock opening 222 to allow a luer lock (not shown) of the medication bag 224 to be removed from or inserted into the luer lock opening 222. The plates 221 may be moved closer together to shrink the luer lock opening 222 to secure the luer lock of the medication bag 224 within the luer lock opening 222. When engaged within the luer lock opening 222, the medication bag 224 may be vertically oriented, with the luer lock positioned at a top of the medication bag 224. This arrangement enables the automated dosing device 200 to insert the needle of a syringe through the luer lock in order to transfer liquid medicament from the syringe to the medication bag 224. In some embodiments, the plates 221 may define a portion of a number of luer lock openings 222, with each luer lock opening 222 having a different diameter. Such a design may enable the medication bag holder 206 to accommodate a larger array of sizes of medication bags 224.

Automated dosing device 200 may include a number of drive mechanisms and electronics that facilitate the rotational and linear movement of various components of the automated dosing device 200. Such components may be seen in FIG. 2B in which a cover of the automated dosing device 200 is removed. For example, the automated dosing device 200 may include a controller 226 containing one or more processors that control the operation of the automated dosing device 200. The controller 226 may be coupled with one or more electric, mechanical, hydraulic, and/or pneumatic motors and/or other actuators (not shown) that drive the movement of the syringe holder 202, vial holder 204, rotating support 206, and/or medication bag holder 208. In some embodiments that use pneumatic actuators, the actuators may be coupled with a valve system, such as on board pneumatic electro valves 228. The controller 226 may be coupled with one or more sensors (not shown), such as linear and/or rotational encoders, that may be used to perform various functions, such as determining controlling actuation of the syringe holder 202, vial holder 204, and/or medication bag holder 208 to determine when the respective container is properly secured by the automated dosing device 200, determine that the various components are properly aligned for fluid transfer procedures, control the amount of distance to move the plunger gripper 210 to transfer fluid to or from the syringe, and/or other functions. Any wires not secured within a housing 230 of the automated dosing device 200 may be routed and secured within a clean e-chain 232 design to prevent particulate accumulation and dispersion from cable movement. It will be appreciated that the form factor of the automated dosing device 200 may be driven by the need to facilitate the delivery of first air from a clean air source (such as clear air source 114) and to be cleaned by an operator. Oftentimes, the form factor of the automated dosing device 100 may exhibit a compact size, may include a thin section exposed to clean airflow, and/or may include rounded protective covers.

Figure 3A:
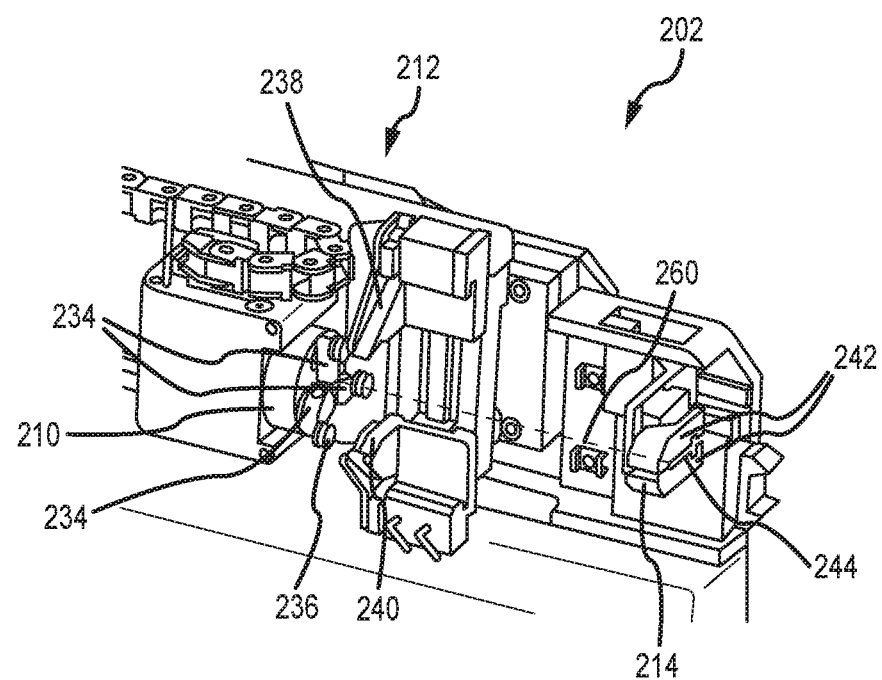
FIG. 3A illustrates a syringe holder of the automated dosing device of FIG. 2A.

FIG. 3A illustrates the syringe holder 202 without a syringe. As noted above, the syringe holder 202 may include plunger gripper 210, body gripper 212, and/or luer lock gripper 214. The plunger gripper 210 may include a number of arms 234 that are mounted in a radially pattern. As illustrated, plunger gripper 210 includes three arms 234, however other numbers of arms 234 may be utilized in various embodiments. Each arm 234 may include a gripping element 236 positioned near a distal end of the arm 234 that may securely grasp edges and/or an underside of the plunger of a syringe. In some embodiments, gripping elements 236 may be generally circular discs, which may include grooves that receive peripheral edges of the plunger. To adjust a distance between the gripping elements 236 (to accommodate various plunger diameters and/or to tighten and loosen a grip of the gripping elements 236 on the plunger to secure or release the syringe from the syringe holder 202), the arms 234 may be rotated about a center point, which may move the distal end and gripping element 236 in or out, depending on the direction of rotation. For example, when the arms 234 extend directly outward from the center point (with each arm 234 forming a same angle with adjacent arms 234 on either side), the gripping elements 326 will be at a furthest radial distance from the center point and will be at a loosest position. By rotating each of the arms 234 about the center point, the distal end and gripping element 236 of each arm 234 will be drawn inward to tighten the plunger gripper 210. It will be appreciated that other designs of plunger grippers 210 are possible, such as those with linearly translating gripping elements 236, which accommodate a wide array of plunger sizes.

The body gripper 212 may include two or more arms 238 that are moveable relative to one another to loosen and tighten the body gripper 212. In some embodiments, each arm 238 may include a cutout location 240 that defines a grasping position of the body gripper 212. The body gripper 212 may be designed to grasp the syringe near an end of a body of the syringe so as to eliminate the application of radial force on a medial portion of the body that defines a fluid storage area. The luer lock gripper 214 may operate similar to the body gripper 212 and may include a number of arms 242 that are moveable relative to one another to loosen and tighten the luer lock gripper 214. In some embodiments, each arm 242 may include a cutout location 244 that defines a grasping position of the luer lock gripper 214. The luer lock gripper 214 may be designed to grasp the luer lock and/or other needle hub of the syringe. Such positioning ensures that the needle is not contacted by the automated dosing device 200 and helps correct any misalignment that may occur as a result of manufacturing tolerance issues of the syringe. The syringe needle may be kept in alignment with the expected insertion axis with a gripper (that opens and closes like jaws), which grabs the needle hub and luer lock of the syringe body.

The plunger gripper 210, body gripper 212, and/or luer lock gripper 214 may be translatable relative to each other along a longitudinal axis 260 of the syringe holder 216. For example, one or more linear actuators (not shown) may be used to drive the various movement of the plunger gripper 210, body gripper 212, and/or luer lock gripper 214. This movement may be used to serve several functions. For example, longitudinal translation of one or all of the components of the syringe holder 202 may adjust a length of the syringe holder 202 to accommodate syringes of various sizes. Additionally, translation of the plunger gripper 210 relative to the body gripper 212 and luer lock gripper 214 may be used to push and pull the plunger of a syringe to transfer fluid in and out of the syringe. In some embodiments, one or more linear and/or rotational encoders may be communicatively coupled with actuators that control movement of the plunger gripper 210 so as to provide redundant sensing to ensure that accurate doses of liquid medicament are transferred. In some embodiments, the various grippers of the syringe holder 202 may include a deformable material, such as rubber, which may better help the grippers to grasp the various portions of the syringe.

Figure 3B:
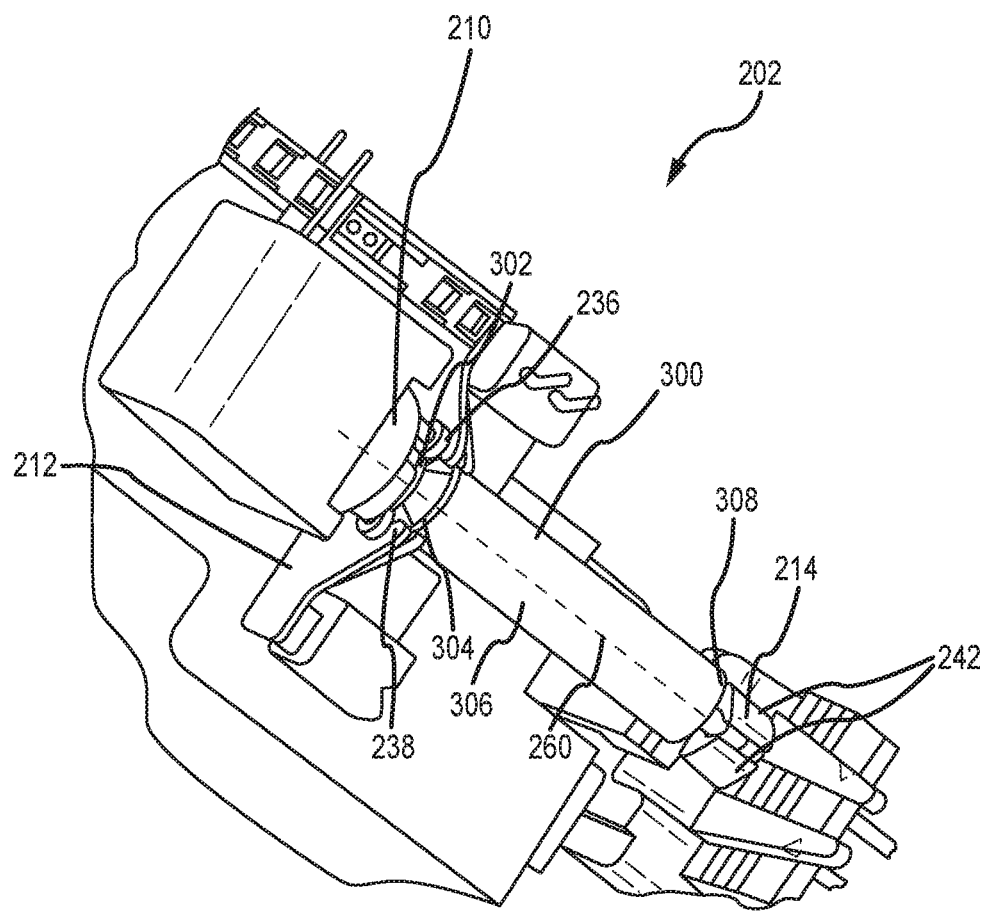
FIG. 3B illustrates a syringe interfaced with the syringe holder of FIG. 3A.

FIG. 3B illustrates a syringe 300 fitted within the syringe holder 202. As shown, a plunger 302 of the syringe 300 is secured within the plunger gripper 210, with peripheral edges of the plunger 302 being received within grooves formed within each gripping element 236. The body gripper 212 is positioned radially about a proximal end 304 of a plunger body 306. The luer lock gripper 214 is positioned radially about a luer lock and/or other needle hub (not shown) that is coupled with a distal end 308 of the syringe 300, allowing the syringe 300 to be secured while a needle 310 (shown in FIG. 5) of the syringe 300 remains untouched by the automated dosing device 200.

Figure 4A:
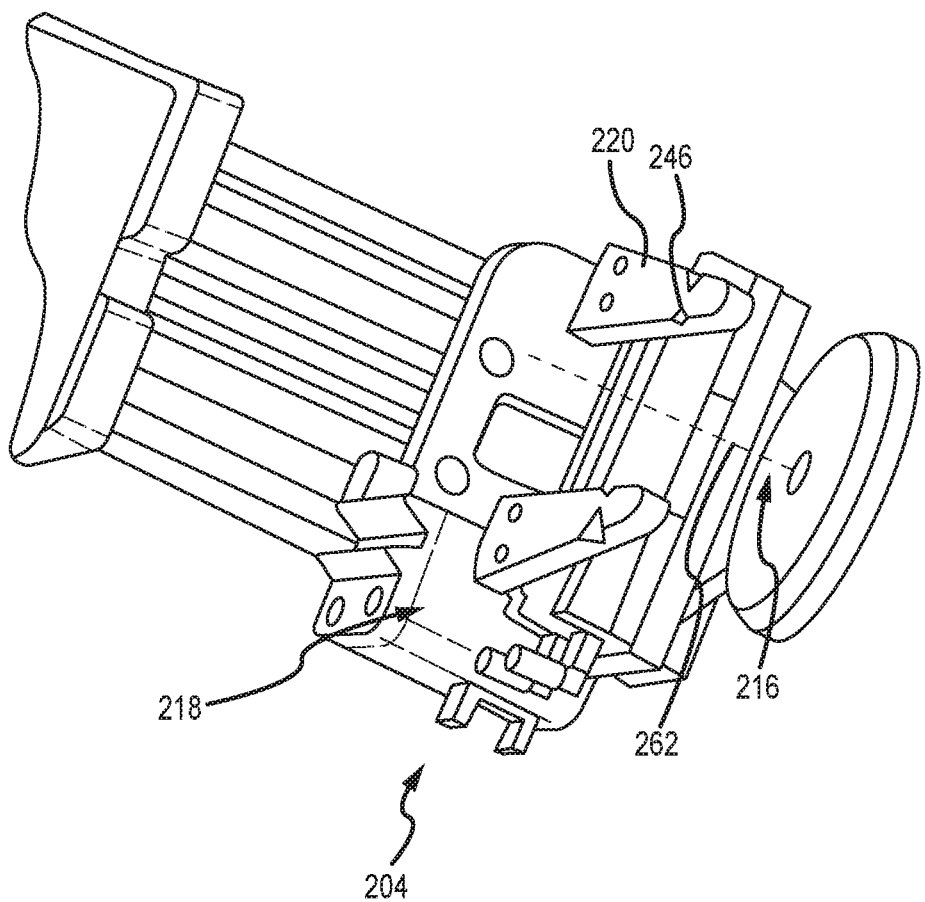
FIG. 4A illustrates a vial holder of the automated dosing device of FIG. 2A.

FIG. 4A illustrates the vial holder 204 without a vial. As noted above, the vial holder 204 may include base plate 216 and cap gripper 218. The base plate 216 may be formed as a generally flat surface that is configured to interface with a bottom of a vial. In some embodiments, the base plate 216 may have a diameter that is greater than a diameter of a largest vial that the vial holder 204 may accommodate in order to ensure that an entire bottom of the vial is supported by the base plate 216. In some embodiments, the base plate 216 may be formed of a material, such as rubber, that is deformable and/or has a high coefficient of friction and/or anti-slip coating that helps maintain the vial in a desired position. The cap gripper 218 may include at least two arms 220 that are spaced apart from the base plate 216 along a longitudinal axis 262 of the vial holder 204. The arms 220 may be movable relative to one another to adjust a distance between the arms 220 to loosen and tighten a grip of the cap gripper 218. In some embodiments, each arm 220 may include a cutout location 246 that defines a grasping position of the cap gripper 218. In some embodiments, each arm 220 of the cap gripper 218 may include a deformable material, such as rubber, which may better help the cap gripper 218 to grasp the cap of the vial. The cap gripper 218 may be translatable relative to the base plate 216 along a longitudinal axis of the vial holder 204. This enables the vial holder 204 to accommodate vials of different lengths.

Figure 4B:
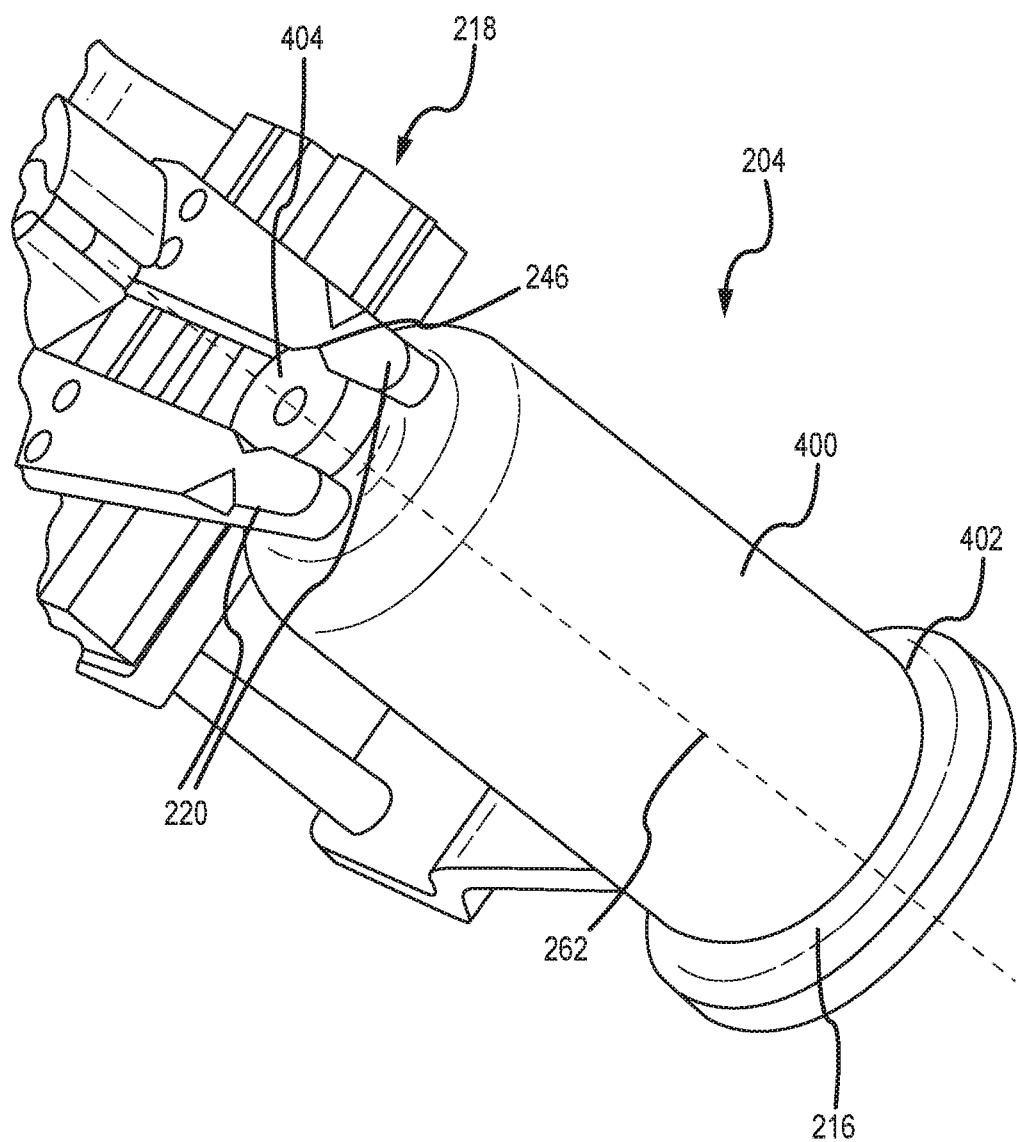
FIG. 4B illustrates a vial interfaced with the vial holder of FIG. 4A.

FIG. 4B illustrates a vial 400 fitted within the vial holder 204. As shown, a base 402 of the vial 400 is positioned against the base plate 216. The cap gripper 218 is grasping a cap 404 of the vial 400. For example, the cap 404 may fit within the cutout location 246 within the arms 220 such that both a top and radial edge of the cap 404 is constrained by the arms 220. In some embodiments, the cap gripper 218 may be designed and positioned so as to not interfere with the flow of clean ISO5 air during the needle insertion. For example, the arms 220 may be designed to leave the septum of the vial 400 exposed. Such clearance may be provided by the cutout locations 246.

Figure 5:
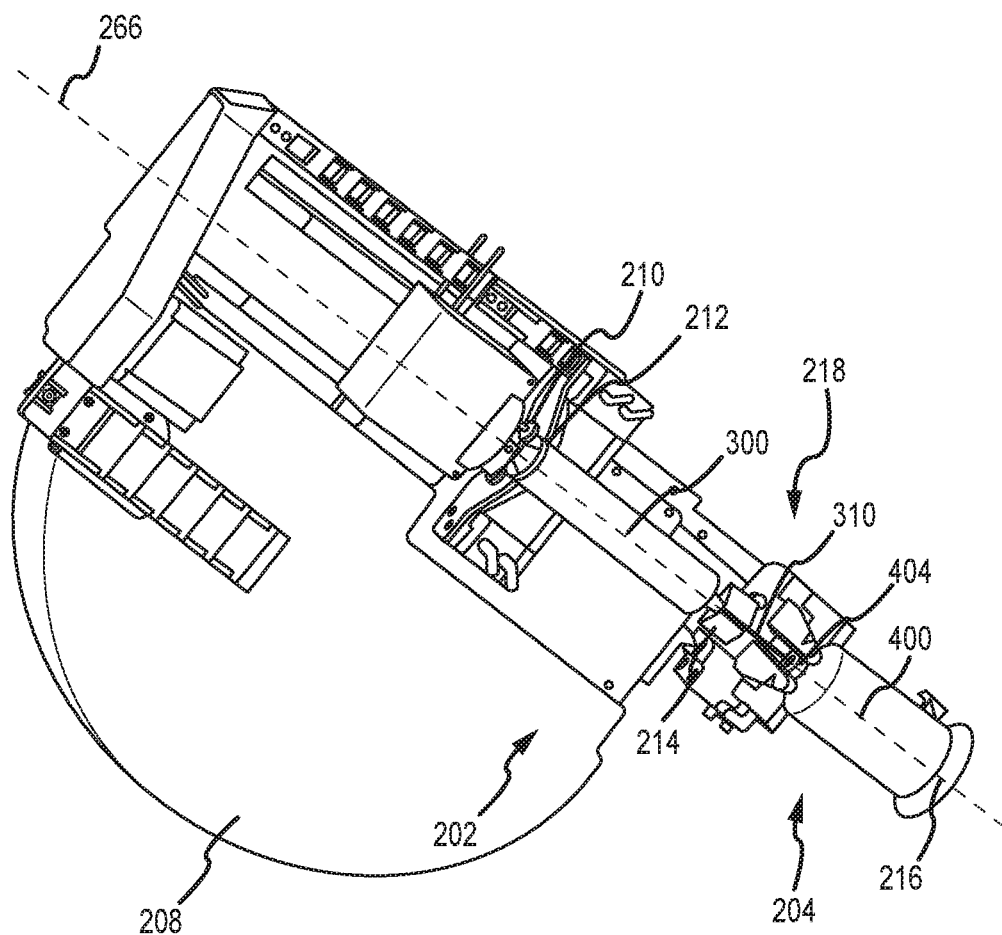
FIG. 5 illustrates the automated dosing device of FIG. 2A in a needle puncture position.
Figure 6:
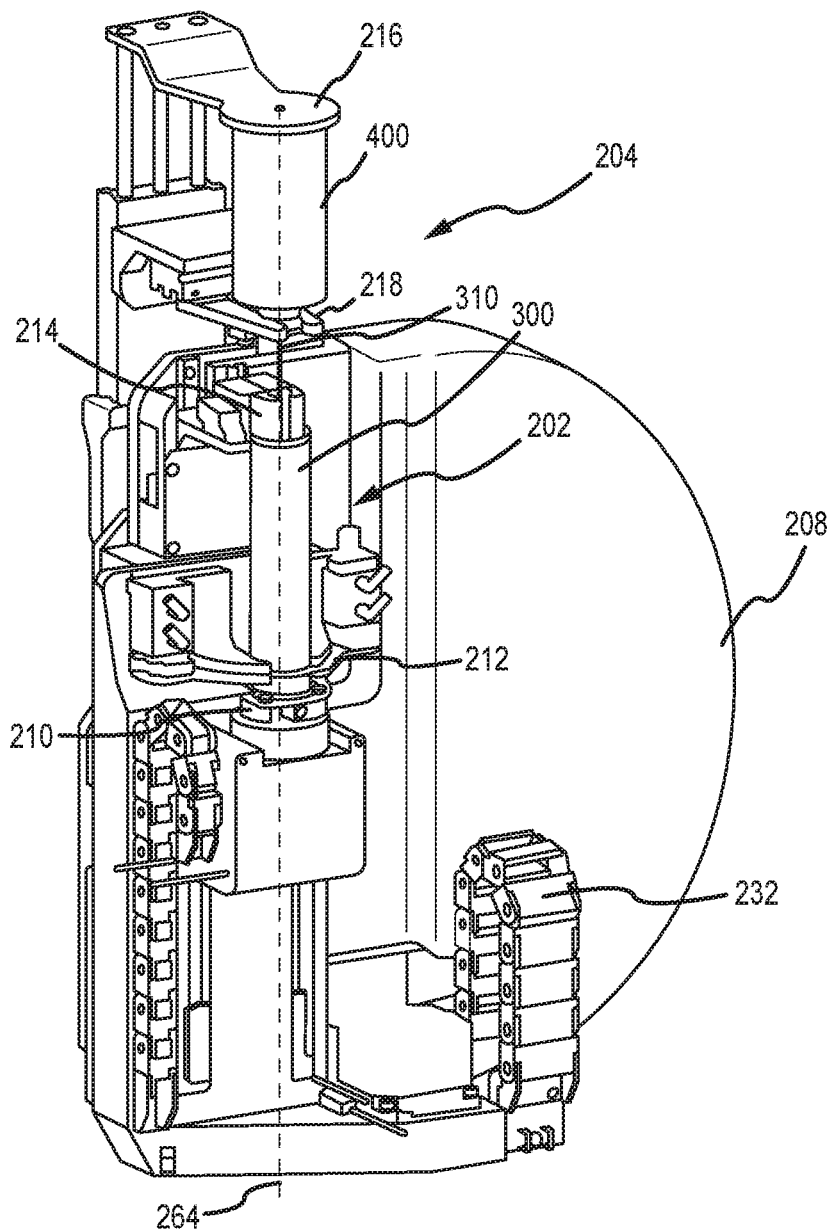
FIG. 6 illustrates the automated dosing device of FIG. 2A in a syringe filling position.

Once a vial 400 and syringe 300 have been loaded in the automated dosing device 200, a needle 310 of the syringe 300 may be inserted into the vial 400. FIG. 5 illustrates the insertion of the syringe 300. This process may be performed with the syringe holder 202 and vial holder 204 aligned at a generally downward angle 266 relative to a horizontal plane. The generally downward angle 266 may be between about 30 and 60 degrees from horizontal, commonly between about 40 and 50 degrees, and often about 45 degrees. This angle 266 enables the needle 310 of the syringe 300 to be inserted through a septum (not shown) of the vial 400 without any leaks or spills of liquid medicament. In some embodiments, the rotating support 208 may be rotated to bring the syringe holder 202 and syringe 300 into proper alignment with the vial holder 204 and vial 400. As the septum and needle 310 are both free from constraints, there may be direct flow of first air from a clean air source at the fluid transfer locations to ensure that the fluid transfer process is free of contamination. Once the components are properly aligned, the syringe holder 202 may be translated toward the vial holder 204 along the generally downward angle (such as by using a linear actuator) such that the needle 310 pierces the septum of the vial 400. Once the needle 310 has been inserted into the vial 400, the vial holder 204 may be engaged with the rotating support 208. The rotating support 208 may then rotate to move both the syringe holder 202 and the vial holder 204 into alignment with a vertical axis 264 as shown in FIG. 6 to begin a fluid transfer process. In this orientation, the vial holder 204 is positioned above the syringe holder 202 with the vial 400 being upside down (with the septum on the bottom) and the needle 310 of the syringe 300 pointing upward. This positioning ensures that all the liquid in the vial 400 is pulled against the septum, which reduces the residual non-extractable volume liquid within the vial 400. The plunger gripper 210 may then be translated relative to the body gripper 212 and luer lock gripper 214 to transfer liquid medicament into the syringe 300. Once a proper dose has been transferred to the syringe 300, the rotating support 208 may rotate to move both the syringe holder 202 and the vial holder 204 back into alignment with the generally downward angle 266 as shown in FIG. 5. The syringe holder 202 may then be translated away from the vial holder 204 to withdraw the needle 310 from the septum of the vial 400. In some embodiments, the syringe 300 may be the end-use container for the dose of liquid medicament. In such embodiments, the syringe 300 may be removed from the syringe holder 202. For example, the plunger gripper 210, body gripper 212, and/or luer lock gripper 214 may be loosened and a robotic arm (not shown) may grasp and remove the syringe 300 from the syringe holder 202. A new syringe may be placed in the syringe holder 202 and the fluid transfer process from the vial 400 may be repeated.

Figure 7:
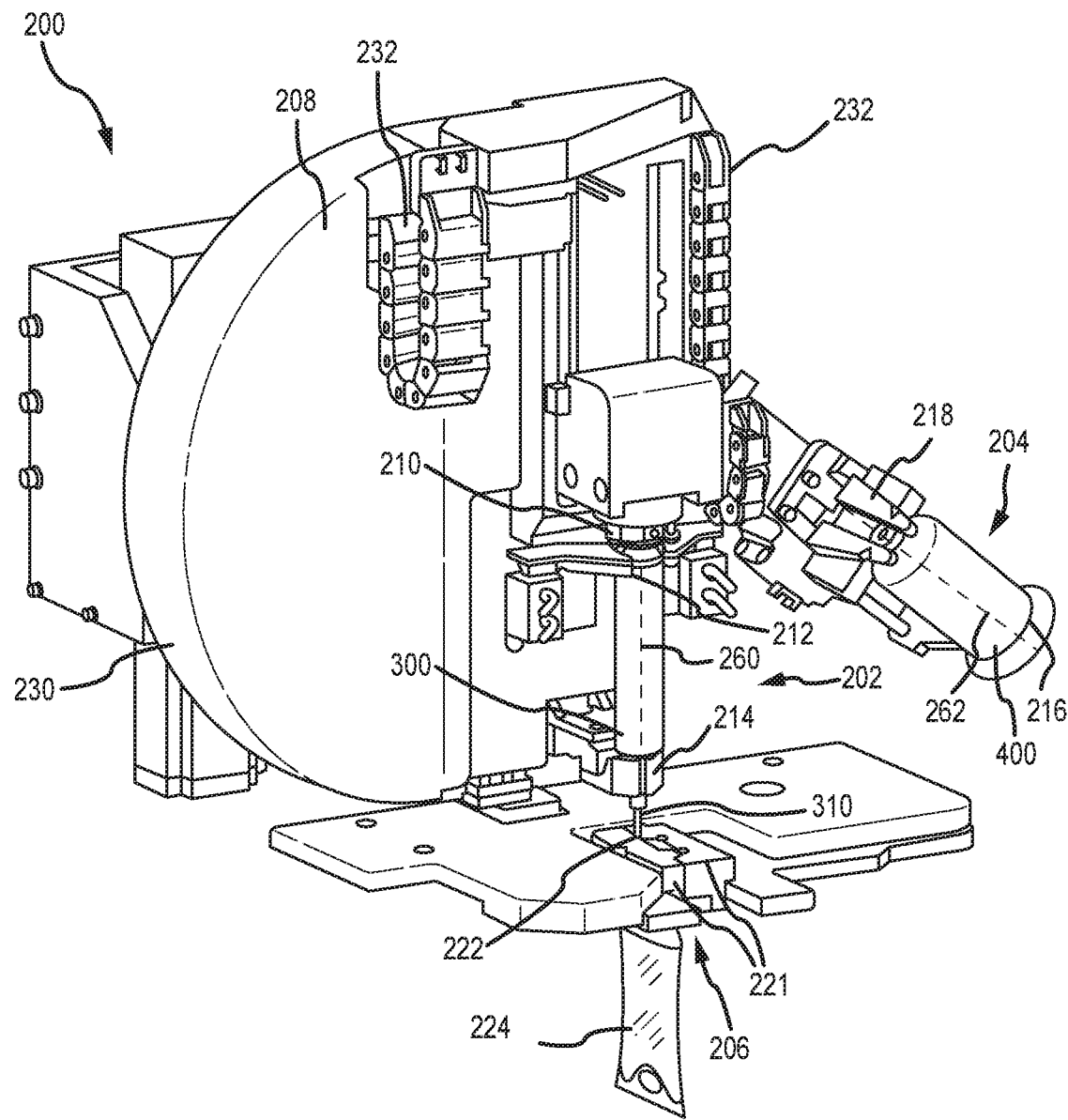
FIG. 7 illustrates the automated dosing device of FIG. 2A in a medication bag filling position.

In some embodiments, the end-user container for the liquid medicament may be the medication bag 224. Once the needle 310 has been withdrawn from the septum, the rotating support 208 may rotate to move the syringe holder 202 and syringe 300 into vertical alignment with the medication bag holder 206 and medication bag 224. The syringe holder 202 may be translated downward to insert the needle 310 into a luer lock or other port (not shown) of the medication bag 224 as illustrated in FIG. 7. Once the needle 310 is inserted within the medication bag 224, the plunger gripper 210 may be translated toward the body gripper 212 and luer lock gripper 214 to transfer liquid medicament from the syringe 300 to the medication bag 224. Upon transfer of the medicament, the syringe holder 202 may be translated upward to remove the needle 310 from the medication bag 224. The medication bag 224 may be removed from the medication bag holder 206 using a robotic arm and another medication bag may be inserted within the medication holder 206. If empty, the syringe 300 may be removed and replaced with a new syringe by the robotic arm.

The vial 400 may remain in the vial holder 204 until the vial 400 is empty (or has less than a full dose remaining) and/or when a new medication is to be transferred. To remove the vial 400, the cap gripper 218 may be loosened and a robotic arm may grasp and remove the vial 400 from the vial holder 204. A new vial may be inserted into the vial holder 204 by the robotic arm.

In some embodiments, the syringe 300 may be used to transfer liquid medicament into the vial 400. For example, when fluid is present within the syringe 300 and the needle 310 is inserted within the septum of the vial 400, the plunger gripper 210 may be translated toward the body gripper 212 and luer lock gripper 212 to transfer fluid from the syringe 300 to the vial 400. In some embodiments, the transfer of fluid may be done while the syringe holder 202 and vial holder 204 are vertically oriented as shown in FIG. 6 and/or while the syringe holder 202 and vial holder 204 are aligned along the downward angle such as shown in FIG. 5.

Figure 8:
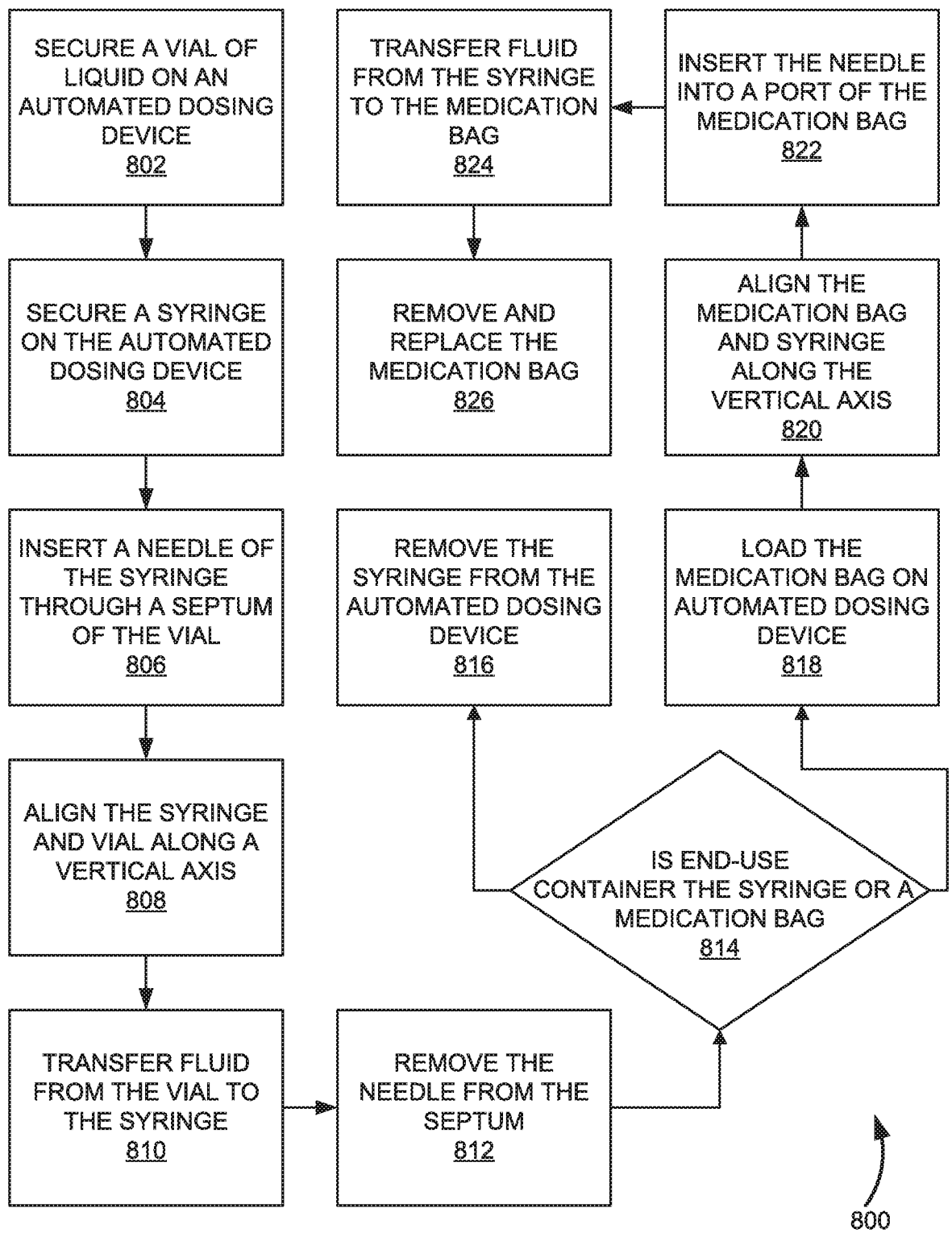
FIG. 8 is a flowchart illustrating a process of transferring a liquid medicament according to embodiments of the present invention.

FIG. 8 is a flowchart of a process 800 for transferring liquid medicament from a vial to an end-use container. Process 800 may be performed using an automated dosing device, such as automated dosing devices 102 and 200 as described above. Process 800 may begin at block 802 by securing a vial of liquid medicament within a vial holder of the automated dosing device. For example, a robotic arm may insert the vial into a vial holder such that a bottom of the vial is positioned against a base plate of the vial holder. An arm of a cap gripper of the vial holder may close about a cap of the vial, while leaving a septum of the vial exposed. At block 804, an empty syringe may be secured within a syringe holder of the automated dosing device. For example, a robotic arm may position the syringe within the syringe holder. A plunger of the syringe may be secured by a plunger gripper of the automated dosing device. For example, a number of gripping elements of the plunger gripper may be tightened against the plunger. In some embodiments, this may involve peripheral edges of the plunger being received within grooves of the gripping elements. A luer lock and/or other needle hub of the syringe may secured within a luer lock gripper, which may involve tightening a pair of arms of the luer lock gripper against the luer lock. In some embodiments, a body gripper may grasp a proximal end of the syringe body (proximate the plunger). It will be appreciated that the vial and syringe may be secured by the automated dosing device in any order.

Figure 9:
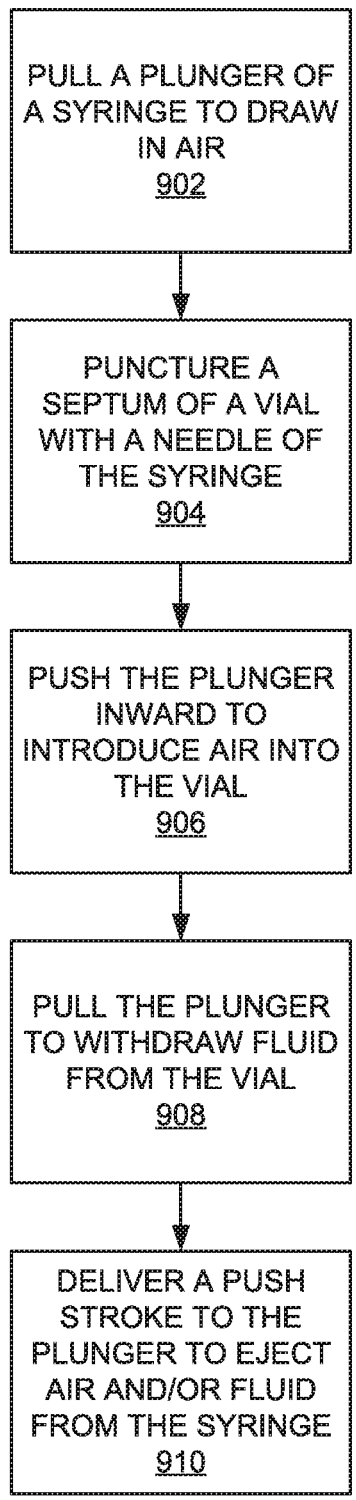
FIG. 9 is a flowchart illustrating a milking process according to embodiments of the present invention.

At block 806 the syringe holder and the vial holder may be moved closer together to insert a needle of the syringe through a septum of the vial. This insertion may be performed while longitudinal axes of the syringe and the vial are at a downward angle relative to horizontal, and while the vial holder is at a lower position than the syringe holder. In some embodiments, prior to inserting the needle into the septum, the syringe holder and the vial holder may need to be aligned. For example, a rotating support of the automated dosing device may be rotated to move the syringe holder into alignment with the vial holder along the downward angle. Once the needle has been inserted into the septum, the syringe holder and the vial holder may be rotated by the rotating support to align the longitudinal axes of the vial holder and syringe holder with a vertical axis at block 808. In such an orientation, the vial holder is positioned above the syringe holder. This ensures that the liquid in the vial is drawn downward against the septum to minimize residual dosing losses. At block 810, fluid may be transferred from the vial to the syringe. For example, the plunger gripper may be pulled away from the luer lock gripper to transfer a volume of the liquid medicament into the syringe. In some embodiments, In some instances, the first set of doses (one or more) from a vial may be drawn while there is only a small volume of air within the vial. This lack of air may lead to a pressure differential between the interior of the vial and atmospheric pressure being large, which may lead to leaking liquid and/or drawing air from the vial into the syringe. To prevent these effects, a milking process, such as described in greater detail in relation to FIGS. 9-10F, may be performed for one or more of the first doses withdrawn from a vial. The milking process may use a combination of positive and negative pressure steps to maintain a pressure differential between the interior of the vial and atmospheric pressure within a desired range to facilitate efficient transfer without leaks or bubbles.

Once the syringe has been filled, the needle of the syringe may be removed from the septum of the vial at block 812. For example, the rotating support may rotate the syringe holder and the vial holder back into alignment with the downward angle. The syringe holder may be translated away from the vial holder along the downward axis to withdraw the needle from the septum. At block 814, the process 800 involves determining whether the end-use container is the syringe or a medication bag. If the end-use container is the syringe, the syringe may be removed from the syringe holder at block 816. For example, the plunger gripper, body gripper, and/or luer lock gripper may be loosened, allowing a robotic arm to grasp and remove the syringe. A new syringe may be positioned and secured within the syringe holder and the fluid transfer process may be repeated.

In embodiments in which the end-use container is a medication bag, the medication bag may be loaded into a medication bag holder of the automated dosing device at block 818. In some embodiments, this may involve a robotic arm inserting a luer lock or other port of the medication bag in between plates of the medication bag holder. It will be appreciated that the loading of the medication bag may occur at any point earlier in process 800 in some embodiments, including during the fluid transfer process from the vial to the syringe. At block 820, the syringe holder and syringe may be aligned with the medication bag along the vertical axis by rotating the rotating support and syringe holder. In this vertical alignment, the needle of the syringe is pointed downward toward the medication bag. At block 822, the syringe holder may be translated downward toward the medication bag to insert the needle of the syringe into the port of the medication bag. Fluid may be transferred from the syringe to the medication bag at block 824. For example, the plunger gripper may be translated toward the luer lock gripper to force the liquid medicament into the medication bag. The medication bag may be removed and replaced at block 826. For example, the syringe holder may be translated upward away from the medication bag to remove the needle of the syringe from the port of the medication bag. The medication bag holder may be released and a robotic arm may grasp and remove the medication bag.

Process 800 may be repeated any number of times to transfer fluid from a vial to a syringe and/or medication bag. Liquid medicament may be transferred from the vial numerous times until the vial is empty (or has less than a full dose remaining) and/or when a new medication is to be transferred. To remove the vial, the cap gripper may be loosened and a robotic arm may grasp and remove the vial from the vial holder. A new vial may be inserted into the vial holder by the robotic arm. Process 800 may also include blowing clean air directly onto fluid transfer locations of the automated dosing device.

In pharmacy practice, when medication is transferred from a vial to a syringe, the difference in pressure between the vial and the syringe controls the rate at which the transfer takes place, with greater the pressure differences resulting in higher liquid flow rates. The pressure difference can be increased either by first pushing additional air from the syringe into the vial or by drawing back the plunger of the syringe to reduce the pressure in the syringe. In either case, the needle serves as a flow restriction and the greater the pressure difference, the faster the flow of air or liquid through the needle.

Also, when drawing liquid from a vial into a syringe, a seal is formed between the needle and the rubber septum of the vial. On one side of this seal is atmospheric pressure and on the other, the pressure inside the vial. If the pressure inside the vial is too large, liquid from the vial will pass through the seal, causing leaks and drips. If the pressure (vacuum) inside the vial is too low, air will be drawn past the seal and into the vial. Because of the position of the vial and syringe during dose drawing, this air is usually drawn into the needle (and syringe) instead of the liquid, introducing dosing errors. To prevent either of these conditions occurring, it is necessary to control the pressure difference, either positive or negative, between the vial and atmospheric pressure. This can be thought of as there being two pressure limits inside the vial. One is a positive pressure limit above atmospheric pressure and the other a negative pressure limit (vacuum) below atmospheric pressure. If either limit is exceeded while drawing a dose, leakage occurs causing dosing errors. Typically, the positive and negative pressure limits are approximately symmetrical about (above and below) atmospheric pressure. For example, if atmospheric pressure is 101.325 kPa and the pressure limits are ±25 kPa, as implied by ISO 8871-5 and USP <381>, the upper pressure limit would be 126.325 kPa and the lower limit 76.325 kPa.

When the vial is full, or nearly full, only a small amount of air can be pushed in without exceeding the positive pressure limit. Likewise, only a small amount of liquid can be drawn from the vial without exceeding the negative pressure limit. The result is that drawing a dose from a nearly full vial requires several movements of the syringe plunger, first pushing some air into the vial (but not exceeding the positive pressure) and then drawing some liquid from the vial (but not exceeding the negative pressure limit. This process of transferring the dose in several increments is referred to in pharmacy practice as "milking" the vial. As the amount of air in the vial increases, more air can be pushed in without exceeding the positive pressure and more liquid can be withdrawn without exceeding either pressure limit. Eventually, the amount of air in the vial increases to the point that a full dose can be withdrawn without exceeding a pressure limit.

In manual pharmacy, the milking process is carried out either at positive pressure, or at negative pressure, but not both. If the pharmacy technician first pushes air from the syringe into the vial, it is operated with positive pressure in the vial. If the pharmacy technician first draws liquid from the vial, the milking process is operated at negative pressure. Positive pressure milking tends to be faster, but is prone to leaks and drips. Negative pressure milking avoids leaks or drips, but is generally slower. Either way, the pharmacy technician monitors the vial visually during the process to control leaks and drips, rather than monitoring pressure limits.

When done by an electromechanical dosing device, visual monitoring is difficult, so it is desirable to control the process such that neither the positive or negative pressure limit is violated. The number of syringe strokes that are required and the speed at which the milking process takes place may be optimized when both positive and negative pressures are used and the pressures are allowed to approach the pressure limits as closely as can be controlled. In pressure-balanced milking, the syringe plunger motions are controlled so the positive pressure produced when air is pushed into the vial stops just below the positive pressure limit and the vacuum produced when liquid is drawn from the vial stops just above the negative pressure limit.

If the initial volume of air in the vial (and its pressure, if not atmospheric) are known, the amount of additional air than can be pushed in and the amount of liquid that can be withdrawn without exceeding either pressure limit can be calculated by systematic application of the universal gas equation of state: PV=nRT, where: P is the air pressure, V is the air total volume (syringe+vial), n is the number of moles of air, R is the gas constant, and T is the temperature of the air.

Knowing the amounts of air or liquid that can be transferred without exceeding pressure limits translates into changes in the volumes of air and liquid in the syringe, which translate into the length the plunger has to travel in each step of the milking process. Thus, it is possible to calculate all plunger motions required for an electromechanical dose drawing mechanism, optimizing the flow rates of both air and liquid and reducing the number of plunger strokes required to draw the complete dose.

Figure 10A:
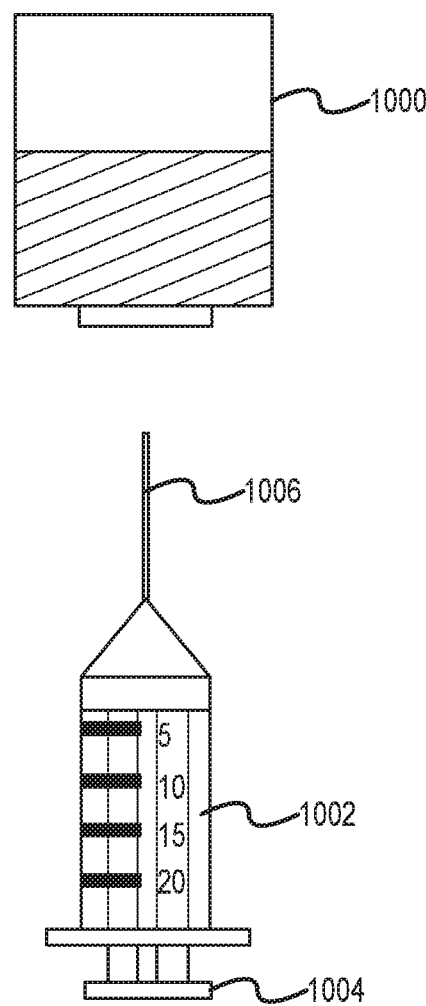
FIG. 10A illustrates a vial and syringe in an initial step of a milking processing according to embodiments of the present invention.
Figure 10B:
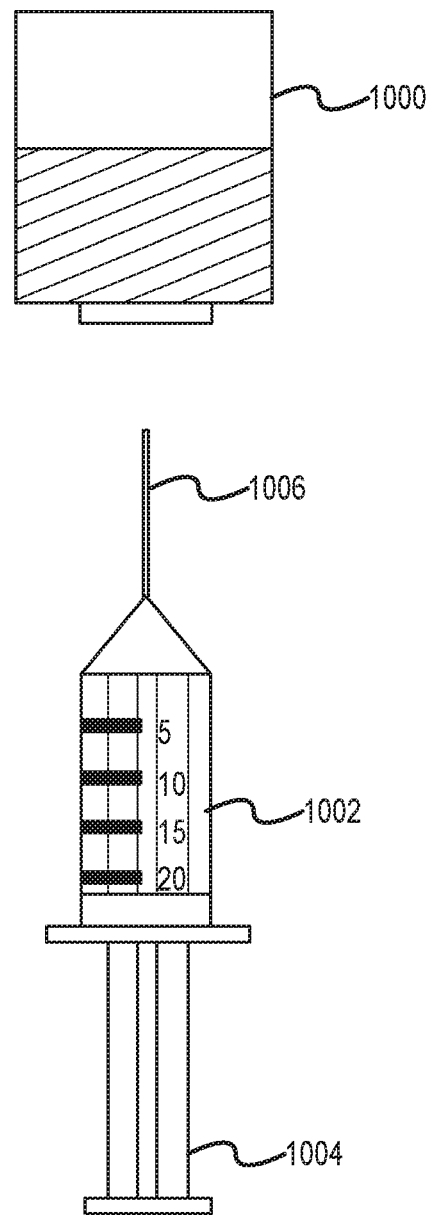
FIG. 10B illustrates the vial and syringe of FIG. 10A with a plunger of the syringe in an initial air draw position.

As noted above, a milking process 900 may be performed for one or more of the first doses withdrawn from a vial 100, as described in relation to FIGS. 9 and 10A-10F. The milking process 900 may combine positive and negative pressure techniques to maintain a pressure differential between the interior of the vial and atmospheric pressure within a desired range to facilitate efficient transfer without leaks or bubbles. Process 900 may be performed using an automated dosing device, such as automated dosing devices 102 and 200 as described above. Process 900 may be performed using the vial 1000 with having a drug volume that is equal to or greater than a volume that is to be transferred ($V_{ds}$) to a syringe 1002 as shown in FIG. 10A. Process 900 may begin at block 902 by pulling the syringe plunger 1004 as shown in FIG. 10B in order to have enough air to compensate the drug transfer from the vial 1000 and have, at the end of the process 900, the vial internal pressure equalized to the final vial air pressure. If the initial vial air pressure is already equal to the final vial air pressure desired, the plunger 1004 may be pulled to $V_{ds}$. Otherwise, if the initial vial air pressure is greater than the desired final vial air pressure, the preload air syringe volume will be less than $V_{ds}$.

Figure 10C:
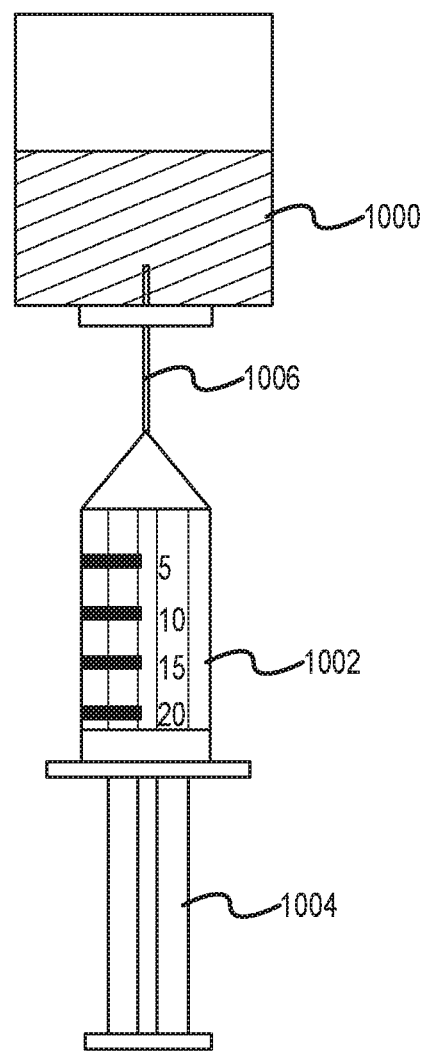
FIG. 10C illustrates the vial and syringe of FIG. 10A with a needle of the syringe inserted within the vial.

After the air is preloaded into the syringe 1002, the needle 1006 can be inserted into the vial 1000 at block 904 as shown in FIG. 10C. When the vial is punctured by the syringe's needle 1006, the system pressure ($P_{sys}$) will be:

$$P_{sys} = \frac{P_{atm} * (V_{as0} + V_{ds}) + P_{v0} * V_{av0}}{V_{as0} + V_{ds} + V_{av0}},$$

where $P_{atm}$ is atmospheric pressure (101325 kPa), $P_{v0}$ is the initial vial air pressure, $V_{av0}$ is the initial vial air volume, and $V_{as0}$ is the initial syringe volume. The initial syringe volume $V_{as0}$ is needed in order to have (at the end of the milking process) the vial pressure equalized with atmospheric pressure. In some embodiments, the initial syringe volume $V_{as0}$ may be computed as:

$$V_{as0} = \text{MAX}\left(0, V_{ds} - (P_{v0} - P_{atm}) * \frac{V_{av0}}{P_{atm}}\right).$$

Figure 10D:
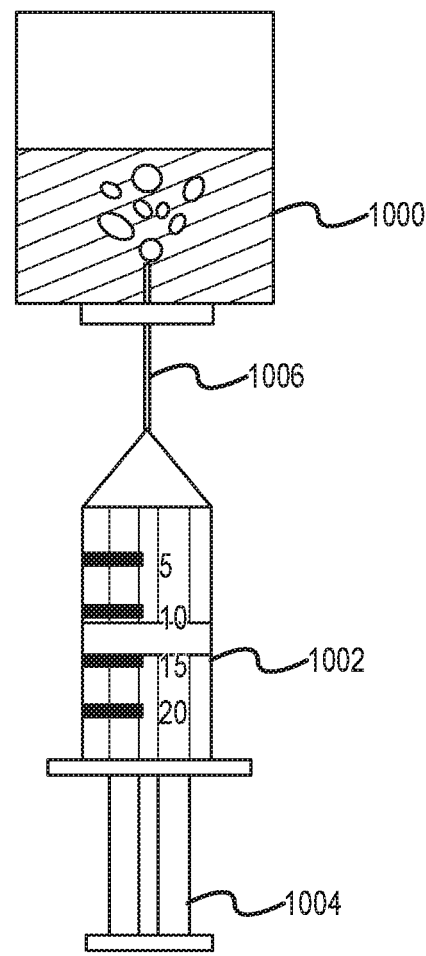
FIG. 10D illustrates the vial and syringe of FIG. 10A with the plunger of the syringe pushed inward in an initial push step.
Figure 10E:
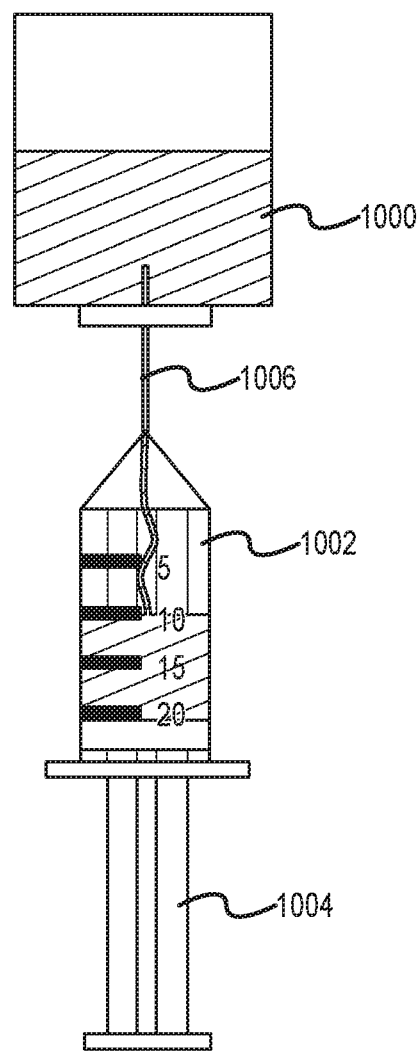
FIG. 10E illustrates the vial and syringe of FIG. 10A with the plunger withdrawn and the syringe full of a volume of fluid.

An initial push stroke to inject a volume of air into the vial 1000 as shown in FIG. 10D may be performed at block 906. The plunger may be pulled at block 908 to draw liquid into the syringe 1002 as shown in FIG. 10E. In some embodiments, the plunger pull stroke movement may be executed at the fastest speed that allows the drug to be transferred to the syringe without issues (bubble creation in the liquid transferred, foam creation, etc.). The pulling of the plunger 1004 may continue until the syringe plunger volume has reached the syringe nominal volume, the minimum vial pressure is reached, the minimum syringe pressure is reached, and/or the syringe 1002 has reached 110% of the requested volume (which may operate as a safety tolerance in order to avoid underdose syringes 1002, the next push will expel all the air and the liquid in excess). During a pull stroke, the drug is extracted from the vial 1000. The algorithm calculates the drug transferred during the pull stroke by splitting the plunger movement into small time units in which a time duration is constant.

After the pull has stopped, the automated dosing device will wait a dwell time before starting a push stroke at block 910. The automated dosing device will stop to dwell when the liquid flow rate is decreasing and its value is under a minimum value, the minimum vial pressure is reached, the volume of liquid contained in the syringe 1002 has reached 110% of the requested volume, the dwell time has reached the maximum value, and/or the liquid flow rate is equal to 0. If there is no air left in the syringe 1002, the plunger 1004 can reach the volume requested $V_{ds}$. This represents the scenario where the milking process 900 terminates with a pull.

Figure 10F:
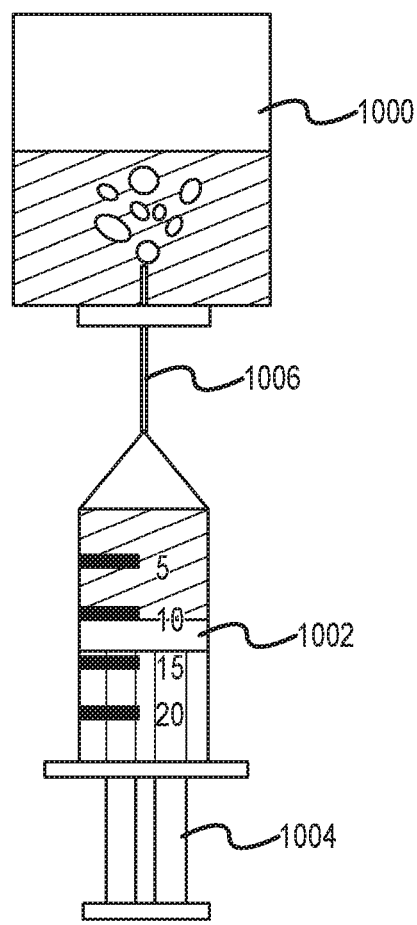
FIG. 10F illustrates the vial and syringe of FIG. 10A with a plunger of the syringe pushed inward in a push step with a final dose of fluid in the syringe.

If the syringe liquid volume is greater or equal to the requested volume $V_{ds}$, then the plunger 1004 will be pushed to the requested volume as shown in FIG. 10F. This represents the scenario where the milking terminates with a push. During the push stroke, the air inside the syringe 1002 is injected into the vial 1000. In some embodiments, the plunger push stroke movement may be executed at maximum plunger speed. After a push stroke, the automated dosing device will wait a constant dwell time to await the stabilization of both the vial pressure and the syringe pressure. If the air volume inside the syringe 1002 is greater than air volume that should be injected to reach a maximum air pressure that the system can reach ($U_{lim}$) then the plunger 1004 will be pushed until the vial max pressure is reached. If the air inside the syringe 1002 is less than the air volume that should be injected to reach $U_{lim}$ and the syringe 1002 has no liquid, then the plunger 1004 will be pushed to reach 0 ml. If the air inside the syringe 1002 is less than the air volume that should be injected to reach $U_{lim}$ and the syringe 1002 has liquid, then the plunger 1004 will be pushed until all air plus a volume of the drug that is equivalent to a constant percentage (such as 3%) of the syringe nominal volume will be pushed back into the vial 1000. If the liquid inside the syringe 1002 is less than this fixed volume, then the plunger 1004 will be pushed to 0 ml.

At the end of the milking process, if possible, the vial pressure will be equalized with the atmospheric pressure. At every step of process 900, the system variables may be updated depending on data calculated in the current and previous steps. The calculations may factor in a friction factor based on liquid and needle parameters, minor losses due to needle geometry, needle liquid volume, and plunger seal rubber deformation based on syringe parameters and pressures. At the end of the process, the plunger 1004 may be positioned to the corresponding $V_{ds}$. At the end of the process, no visible drips may remain over the top of the vial 1000 after the syringe needle 1006 has been removed.

In some embodiments, to avoid spillages from the vial 1000 or entry of bubbles of air into the vial 1000, the maximum pressure $U_{lim}$ and the minimum pressure $L_{lim}$ that the system can reach may be established before the process starts. During the process, if all other conditions permit, the vial pressure will be increased to $U_{lim}$ during the push stroke and then will be decreased to $L_{lim}$ during the pull stroke. The number of push and pull strokes may vary depending on syringe size, initial vial air volume, initial vial air pressure, and the amount of liquid to draw from the vial 1000.

In some embodiments of the milking process 900, the automated dosing device may transfer the volume $V_{ds}$ from the vial 1000 to the syringe 1002 with a predetermined level of accuracy. For example, the transfer may be completed within 5% accuracy for dosages of >=5 ml and to within 10% accuracy for dosages of <5 ml, although other tolerance levels and/or dosage volumes may be used to meet the needs of a particular application. The automated dosing device may operate to use the minimum number of plunger strokes in order to make the milking procedure as fast as possible. This means that in some embodiments, during the entire milking process 900 there is at a maximum of one correctional push stroke to eject a small fraction of the liquid contained in the syringe 1002 back into the vial 1000. In some embodiments, no visible spillage may come from the vial during the whole milking process 900. In some embodiments, the difference in the sums of the weights of the vial 1000 and the syringe 1002 after and before the process may not exceed a particular threshold, such as 0.1 g, to minimize waste. In some embodiments, no air (visible bubbles) may enter the vial 1000 during the milking process.

In some embodiments, the milking process may include a function for sensing pressure in the closed system. For example, the pressure may be sensed by a pressure sensor, such as (but not limited to) one or more strain gauges on a plunger gripper of a syringe holder as described herein, one or more strain gauges placed on the syringe holder itself, and/or a plunger drive motor current sensor. The pressure level detected by the pressure sensor(s) may be used to prevent excessive pressure in the syringe 1002 that may result from blockage of the fluid path by a defective syringe or needle. The sensed pressure may be used to sense when pressure has equalized within the closed system, indicating flow has completed in response to motion of the syringe plunger 1004.

Figure 11:
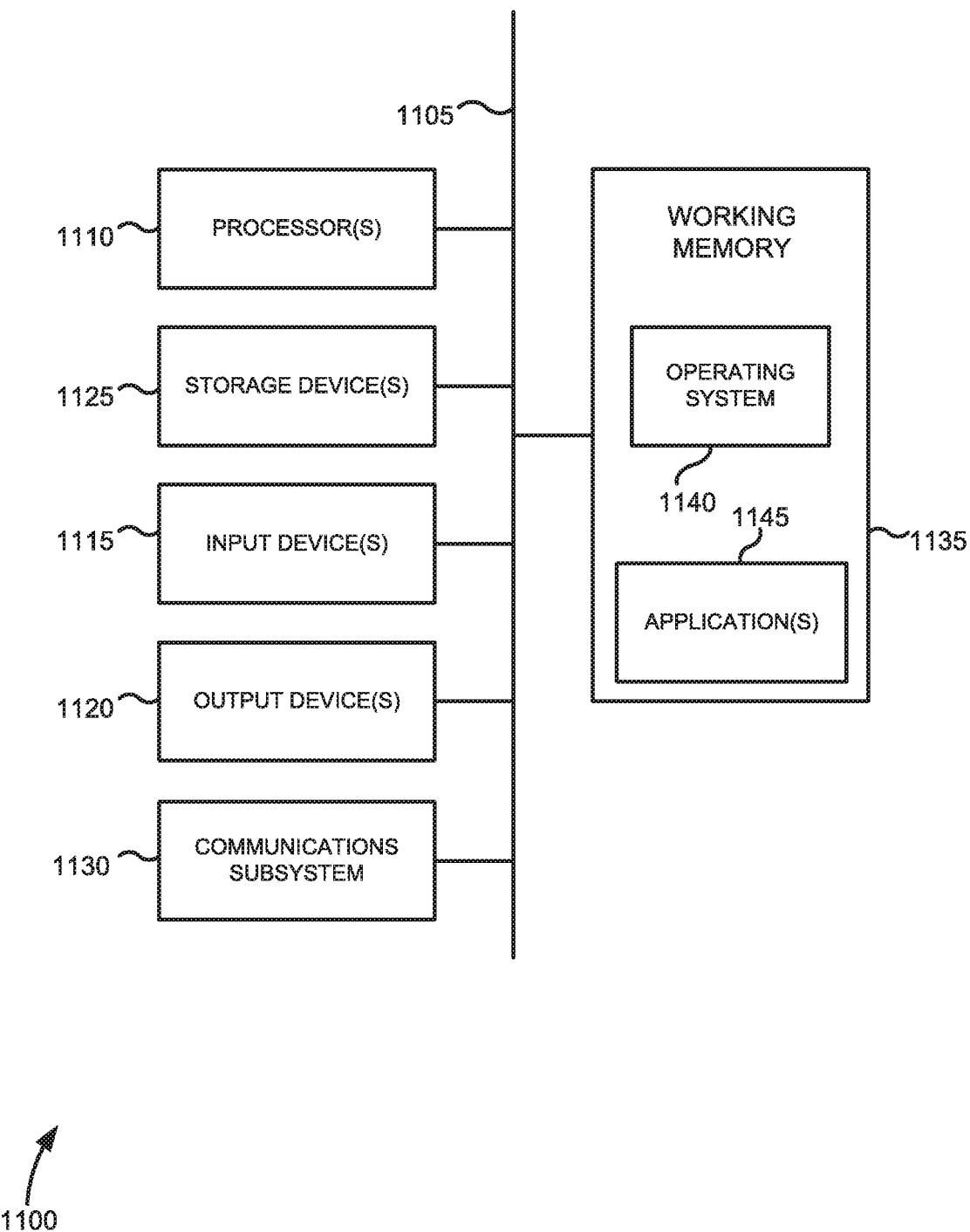
FIG. 11 is a block diagram of a computing system according to embodiments of the present invention.

A computer system as illustrated in FIG. 11 may be incorporated as part of the previously described computerized devices. For example, computer system 1100 can represent some of the components of automated dosing device 102, 200, robotic arm 112, and/or other computing devices described herein. FIG. 11 provides a schematic illustration of one embodiment of a computer system 1100 that can perform the methods provided by various other embodiments, as described herein. FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105 (or may otherwise be in communication, as appropriate). The hardware elements may include a processing unit 1110, including without limitation one or more processors, such as one or more special-purpose processors (such as digital signal processing chips, graphics acceleration processors, and/or the like); one or more input devices 1115, which can include without limitation a keyboard, a touchscreen, receiver, a motion sensor, an imaging device, and/or the like; and one or more output devices 1120, which can include without limitation a display device, a speaker, and/or the like.

The computer system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1100 might also include a communication interface 1130, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 1130 may permit data to be exchanged with a network (such as the network described below, to name one example), other computer systems, and/or any other devices described herein. In many embodiments, the computer system 1100 will further comprise a non-transitory working memory 1135, which can include a RAM or ROM device, as described above.

The computer system 1100 also can comprise software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 1110, applications 1145, etc.) Further, connection to other computing devices such as network input/output devices may be employed.

Some embodiments may employ a computer system (such as the computer system 1100) to perform methods in accordance with the disclosure. For example, some or all of the procedures of the described methods may be performed by the computer system 1100 in response to processing unit 1110 executing one or more sequences of one or more instructions (which might be incorporated into the operating system 1140 and/or other code, such as an application program 1145) contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processing unit 1110 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1100, various computer-readable media might be involved in providing instructions/code to processing unit 1110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1125. Volatile media include, without limitation, dynamic memory, such as the working memory 1135. Transmission media include, without limitation, coaxial cables, copper wire, and fiber optics, including the wires that comprise the bus 1105, as well as the various components of the communication interface 1130 (and/or the media by which the communication interface 1130 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 1130 (and/or components thereof) generally will receive the signals, and the bus 1105 then might carry the signals (and/or the data, instructions, etc. carried by the signals) to the working memory 1135, from which the processor(s) 1105 retrieves and executes the instructions. The instructions received by the working memory 1135 may optionally be stored on a non-transitory storage device 1125 either before or after execution by the processing unit 1110.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method of preparing liquid medication doses using an automated dosing device, comprising:
   securing a vial within a vial holder of the automated dosing device, wherein the vial comprises a liquid medicament;
   securing an empty syringe within a syringe holder of the automated dosing device, with a plunger of the syringe being secured by a plunger gripper of the automated dosing device and a luer lock of the syringe being secured within a luer lock gripper of the syringe holder;
   aligning and moving the syringe holder and the vial holder closer together to insert a needle of the syringe through a septum of the vial while longitudinal axes of the syringe, a needle of the syringe, and the vial are at a generally downward angle relative to horizontal and while the vial holder is at a lower position than the syringe holder;
   rotating the syringe holder and the vial holder to align the longitudinal axes of the syringe and the vial with a vertical axis, with the vial holder positioned above the syringe holder; and
   pulling the plunger gripper away from the luer lock gripper while the luer lock is secured within the luer lock gripper to transfer a volume of the liquid medicament into the syringe.

2. The method of preparing liquid medication doses using an automated dosing device of claim 1, further comprising:
   loading the syringe in the syringe holder using a robot arm.

3. The method of preparing liquid medication doses using an automated dosing device of claim 1, further comprising:
   releasing the syringe from the syringe holder to a robot arm.

4. The method of preparing liquid medication doses using an automated dosing device of claim 1, further comprising:
   aligning the syringe holder with a medication bag along the vertical axis;
   moving the syringe holder closer to the medication bag to insert the needle of the syringe into a port of the medication bag; and
   pushing the plunger gripper toward the luer lock gripper to transfer the volume of the liquid medicament into the medication bag.

5. The method of preparing liquid medication doses using an automated dosing device of claim 1, further comprising:
   rotating the syringe holder and the vial holder such that the longitudinal axes are at the generally downward angle; and moving the syringe holder and the vial holder apart from one another to withdraw the needle from the septum.

6. The method of preparing liquid medication doses using an automated dosing device of claim 1, further comprising:
blowing first air from a clean air source directly onto fluid transfer locations of the automated dosing device.

7. The method of preparing liquid medication doses using an automated dosing device of claim 1, wherein:
pulling the plunger gripper away from the luer lock gripper to transfer a volume of the liquid medicament into the syringe is performed as part of a milking procedure to remove a first number of doses of the liquid medicament from the vial.

8. The method of preparing liquid medication doses of claim 7, wherein:
the milking procedure comprises:
pulling the plunger gripper away from the luer lock gripper to introduce air into the syringe prior to inserting the needle of the syringe through the septum of the vial;
pushing the plunger gripper toward the luer lock gripper to introduce air into the vial after inserting the needle of the syringe through the septum of the vial;
pulling the plunger gripper away from the luer lock gripper to introduce liquid into the syringe; and
determining whether a volume of the liquid in the syringe matches a desired dose.

9. The method of preparing liquid medication doses of claim 8, wherein:
the milking procedure further comprises pushing the plunger gripper toward the luer lock gripper to introduce a portion of the liquid from the syringe back into the vial when the volume of the liquid exceeds the desired dose.

10. The method of preparing liquid medication doses of claim 2, wherein:
pushing the plunger gripper toward the luer lock gripper to introduce a portion of the liquid from the syringe back into the vial is performed after waiting a predefined dwell time.

11. The method of preparing liquid medication doses using an automated dosing device of claim 1, further comprising:
transferring an additional volume of the liquid medicament from the vial into an additional syringe.

* * * * *